US011510058B2

(12) United States Patent
Wu

(10) Patent No.: US 11,510,058 B2
(45) Date of Patent: Nov. 22, 2022

(54) METHODS FOR SUPPORT OF USER PLANE SEPARATION AND USER PLANE LOCAL OFFLOADING FOR 5G NON-3GPP ACCESS

(71) Applicant: TELEFONAKTIEBOLAGET LM ERICSSON (PUBL), Stockholm (SE)

(72) Inventor: Changzheng Wu, Shenzhen (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 92 days.

(21) Appl. No.: 17/043,562

(22) PCT Filed: Mar. 29, 2019

(86) PCT No.: PCT/IB2019/052629
§ 371 (c)(1),
(2) Date: Sep. 29, 2020

(87) PCT Pub. No.: WO2019/186504
PCT Pub. Date: Oct. 3, 2019

(65) Prior Publication Data
US 2021/0127271 A1 Apr. 29, 2021

(30) Foreign Application Priority Data
Mar. 29, 2018 (WO) ................ PCT/CN2018/080995

(51) Int. Cl.
*H04W 12/102* (2021.01)
*H04W 76/12* (2018.01)
(Continued)

(52) U.S. Cl.
CPC ....... *H04W 12/102* (2021.01); *H04W 12/033* (2021.01); *H04W 12/041* (2021.01);
(Continued)

(58) Field of Classification Search
None
See application file for complete search history.

(56) References Cited

U.S. PATENT DOCUMENTS

2018/0167983 A1* 6/2018 Salkintzis ............... H04W 8/22
2018/0288582 A1* 10/2018 Buckley .................. H04W 4/50

OTHER PUBLICATIONS

3GPP TS 23.501 V15.1.0: 3rd. Generation Partnership Project; "Technical Specification Group Services and System Aspects; System Architecture for the 5G System; Stage 2"; Release 15; Mar. 2018; 201 pages.
(Continued)

*Primary Examiner* — Mazda Sabouri
(74) *Attorney, Agent, or Firm* — Sage Patent Group

(57) ABSTRACT

Methods to support User Plane Separation (UPS) and User Plane Local offloading (UPL) for Fifth Generation (5G) non-Third Generation Partnership Project (3GPP) access are provided, including solutions for untrusted non-3GPP, trusted non-3GPP, and fixed/wireline communications via a Non-3GPP interworking Function (N3IWF) node. Three UPS solutions methods are provided, as well as UPL solution methods for 5G non-3GPP access involving N3IWFs with or without separated Control Plane (CP) and User Plane (UP) that are combined with a User Plane Function (UPF). Solutions to allow multiple CP entities to control the same single UP entity are also provided.

7 Claims, 17 Drawing Sheets

(51) Int. Cl.
*H04W 28/08* (2009.01)
*H04W 12/0471* (2021.01)
*H04W 12/041* (2021.01)
*H04W 12/033* (2021.01)
*H04W 80/02* (2009.01)
*H04W 92/02* (2009.01)

(52) U.S. Cl.
CPC ... *H04W 12/0471* (2021.01); *H04W 28/0842* (2020.05); *H04W 76/12* (2018.02); *H04W 80/02* (2013.01); *H04W 92/02* (2013.01)

(56) References Cited

OTHER PUBLICATIONS

3GPP TSG-SA WG2 Meeting No. 126; S2-182513; Clarification on AMF registration with UDM for Registration procedure for untrusted non-3GPP access; Montreal, Canada; Feb. 26-Mar. 2, 2018; 4 pages.
3GPP TSG SA WG3 (Security) Meeting No. 90Bis; S3-180941; "Resolving Editor's Note on N3/WF authentication" San Diego, (US); Feb. 26-Mar. 2, 2018; 4 pages.
SA WG2 Meeting No. 124; S2-178710; "Supporting 3GPP-based access authentication" Reno, Nevada, US; Nov. 27-Dec. 1, 2017; 4 pages.
International Search Report and Written Opinion for PCT/IB2019/052629; dated Jul. 4, 2019; 15 pages.

\* cited by examiner

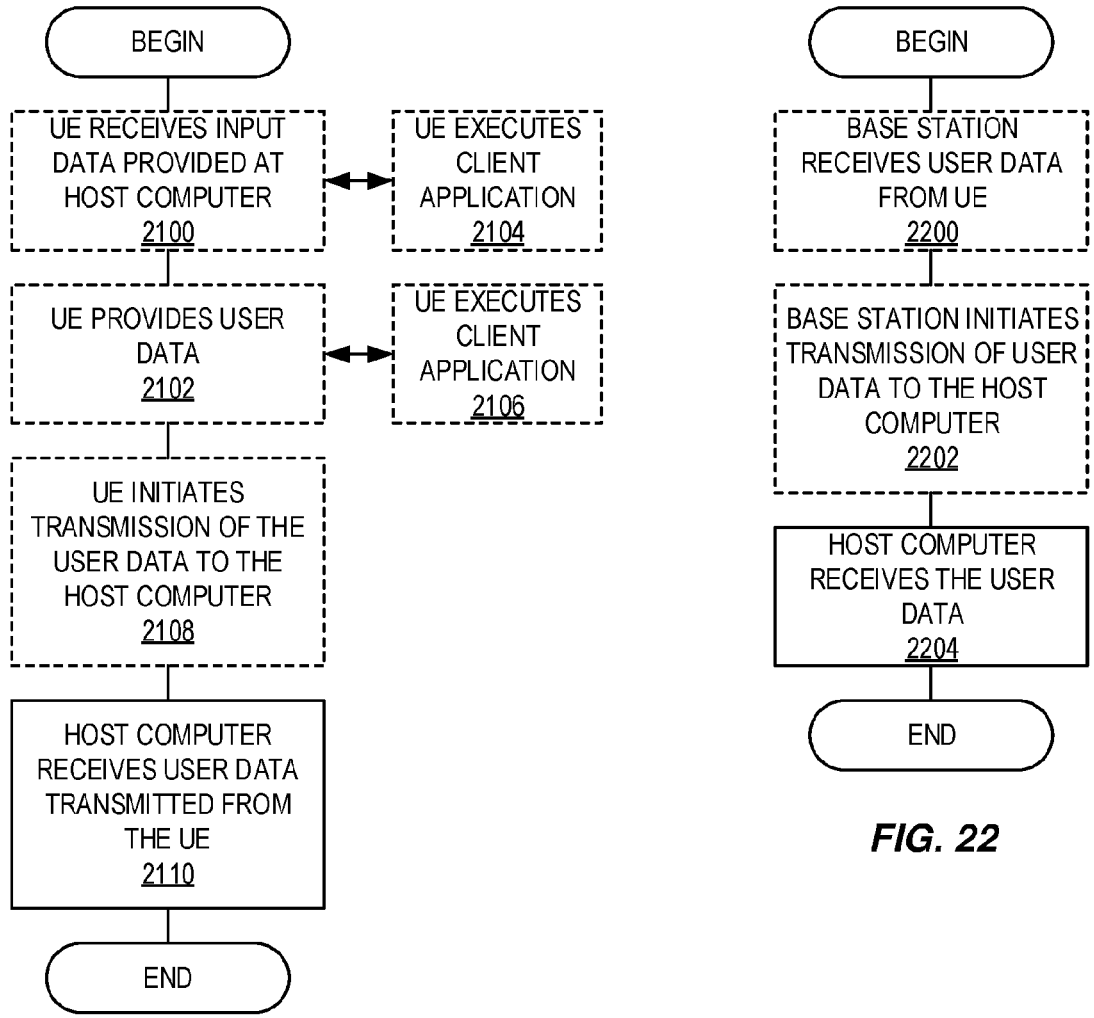

METHODS FOR SUPPORT OF USER PLANE SEPARATION AND USER PLANE LOCAL OFFLOADING FOR 5G NON-3GPP ACCESS

RELATED APPLICATION

This application claims the benefit of application PCT/CN2018/080995, filed Mar. 29, 2018, the disclosure of which is hereby incorporated herein by reference in its entirety.

TECHNICAL FIELD

The present disclosure relates to user plane separation and user plane local offloading for Fifth Generation (5G) non-Third Generation Partnership Project (3GPP) access.

BACKGROUND

In Fifth Generation (5G) network architecture evolution (see section 4.2 in [1]), the Software Defined Networking (SDN) (see [14], [15]) becomes one of important technology enablers. In the SDN architecture the Control and Forwarding Separation, allowing Control Plane (CP) (mainly, SDN controller) to provide view of network resources to the SDN applications to operate network resource in a programmable manner via defined interface.

The 5G network expands upon concepts that existed in earlier Evolved Packet Core (EPC) networks. One such concept is the logical separation of CP functions from User Plane (UP) functions. Another such concept is access to the Core Network (CN) from non-Third Generation Partnership Project (3GPP) compliant entities. Both of these will be discussed in turn.

Separation of Control Plane and User Plane Functions

In EPC, this concept was referred to as Control Plane and User Plane Separation (CUPS); in 5G, this concept is referred to as User Plane Separation (UPS). As used herein, the term CUPS will be used to refer to the EPC implementation specifically, while the term UPS will be used to refer to the concept generally, unless otherwise indicated as specifically referring to the 5G implementation in particular.

EPC. In 3GPP release 15, CUPS was early introduced and defined for Fourth Generation (4G) EPC nodes such as the Serving Gateway (S-GW or SGW), the Packet Data Network (PDN) Gateway (P-GW or PGW), etc.; see [3].

FIG. 1, which is a reproduction of the figure shown in section 4.2.2 of CUPS [3], illustrates CUPS as implemented in a combined SGW/PGW that is divided into a control plane element 100 and a user plane element 102, shown in FIG. 1 along with various defined interfaces to those elements. As can be seen in FIG. 1, some standard interfaces, such as S4, are also divided into a control plane interface, S4-C, and a user plane interface, S4-U.

As used herein, the "-C" suffix indicates a control plane element or interface, and the "-U" suffix indicates a user plane element or interface. As used herein, a control plane element may be alternatively referred to as "a CP node," "a CP function," or as simply "a CP." As used herein, a user plane element may be alternatively referred to as "a UP node," "a UP function," or as simply "a UP."

In the 3GPP CUPS, however, each separated UP node (SGW-U, PGW-U, TDF-U and UPF) is controlled by only one corresponding CP node (SGW-C, PGW-C, TDF-C and SMF). There is no model to support two or more CPs to control one single UP. Even in CUPS of combined SGW/PGW (see section 5.2.6 in CUPS interface [4]), there are respective Sxa configuration and Sxb configuration between combined SGW-C/PGW-C and combined SGW-U/PGW-U.

5G. The 5G network architecture supports UPS by having an individual User Plane Function (UPF) network element perform the user plane functions while the remainder of the entity acts as the Control Plane function to directly (via N4 interface) or indirectly interwork with the User Plane. For example, the EPC entity PGW-C was combined with the session management functions of an EPC Mobility Management Entity (MME) to become the 5G entity Session Management Function (SMF), which performs control plane functions. In 5G networks, the remaining user plane functions are handled by the UPF.

The CUPS definition in 3GPP standard for 4G EPC and the UPS definition in current 5G Phase 1 only covers 3GPP access and does not cover non-3GPP access

SUMMARY

The present disclosure provides solution methods to support User Plane Local Offloading (UPL) for non-Third Generation Partnership Project (3GPP) access in the Fifth Generation (5G) network and support User Plane Separation (UPS) for Non-3GPP Interworking Function (N3IWF). The 5G non-3GPP access in the present disclosure includes untrusted non-3GPP access, trusted non-3GPP access, and non-3GPP fixed access.

The present disclosure gives a general principle for User Equipment (UE) interworking with a UPS-based N3IWF. In one embodiment, for untrusted non-3GPP access including untrusted fixed access, the present disclosure presents designs and procedures based on an extension of Internet Key Exchange (IKE) and Transport Layer Security (TLS) which includes: (1) IKE clone and relocation method and procedures; (2) Internet Protocol Security (IPSEC) endpoint separation method and procedures: (3) TLS-based method and procedures.

The present disclosure presents one "single UP" model for UPL. For UP separated 5G non-3GPP access, it presents combining a N3IWF-User Plane (N3IWF-UP) and a User Plane Function (UPF) as one single implementation node and it provides designs to support using two Control Plane entities (CPs) to control one User Plane Entity (UP), with an implementation method that includes correlating per Quality of Service (QoS) Flow Preliminary Packet Detection Rules (PDRs) respectively from N3IWF and a Session Management Function (SMF). The present disclosure includes solution procedures to combine a N3IWF-UP function into a UPF node and to combine a UPF to a N3IWF-UP node, respectively corresponding to typical untrusted and trusted/fixed access situations.

For UP unseparated non-3GPP access, the present disclosure provides an IKE-based N3IWF redirection solution.

According to one aspect of the present disclosure, a method for UPS and UPL for 5G non-3GPP access and implemented in a UE comprises: establishing an IKE SA with a N3IWF; negotiating with the N3IWF to support UPS; establishing a signaling IPSEC SA to the N3IWF for registration and Non Access Stratum, NAS, signaling to and from the N3IWF; receiving from the N3IWF a request to create an IKE SA clone that is to be associated with an identified N3IWF-User Plane entity, N3IWF-UP; cloning the IKE SA; receiving from the identified N3IWF-UP, a request to relocate the cloned IKE SA to the identified N3IWF-UP; and relocating the cloned IKE SA to exist between the UE and the identified N3IWF-UP.

In some embodiments, the request to relocate the cloned IKE SA to the identified N3IWF-UP is part of the request to create the IKE SA clone that is to be associated with the identified N3IWF-UP.

In some embodiments, the method further comprises: receiving, from the N3IWF-UP, a request to create at least one data IPSEC SA for a bearer channel between the UE and the N3IWF-UP; and creating at least one data IPSEC SA for the bearer channel.

According to another aspect of the present disclosure, a method for UPS and UPL for 5G non-3GPP access and implemented in a N3IWF node comprises: establishing an IKE SA with a UE; determining that the UE supports UPS; establishing a signaling IPSEC SA with the UE for registration and transporting NAS signaling to and from the UE; identifying a N3IWF-User Plane (N3IWF-UP) node; requesting the UE to create an IKE SA clone that is to be associated with the identified N3IWF-UP; receiving the cloned IKE SA from the UE; and providing the cloned IKE SA to the identified N3IWF-UP node.

According to another aspect of the present disclosure, a method for UPS and UPL for 5G non-3GPP access and implemented in a N3IWF-UP comprises: receiving, from a N3IWF, a session setup request, the request comprising a cloned IKE SA associated with a UE; instructing the UE associated with the cloned IKE SA to relocate the IKE SA so that it exists between the N3IWF-UP and the UE; creating a new IPSEC SA between the UE and the N3IWF-UP for at least one bearer; sending, to the N3IWF, a setup session response; and establishing a Protocol Data Unit (PDU) session with a Session Management Function (SMF).

According to another aspect of the present disclosure, a method for UPS and UPL for 5G non-3GPP access and implemented in a UE comprises: establishing an IKE SA with a N3IWF; negotiating with the N3IWF to support UPS; establishing a signaling IPSEC SA with the N3IWF for registration and transporting of NAS signaling; receiving a request to set up an endpoint-separated data IPSEC SA between the UE and a target N3IWF-UP for the user plane.

In some embodiments, receiving the request to set up an endpoint-separated data IPSEC SA between the UE and the target N3IWF-UP for the user plane comprises: receiving a request to create an IKE SA clone that is associated with the target N3IWF-UP and using the cloned IKE SA to set up the data IPSEC SA between the UE and the target N3IWF-UP; or receiving a request to set up the data IPSEC SA between the UE and the target N3IWF-UP via the existing IKE SA clone.

According to another aspect of the present disclosure, a method for UPS and UPL for 5G non-3GPP access and implemented in a N3IWF node comprises: establishing an IKE SA with a UE; determining that the UE supports UPS; establishing a signaling IPSEC SA with the UE for registration and transporting of NAS signaling to and from the UE; identifying a target N3IWF-UP; and setting up an endpoint-separated data IPSEC SA between the UE and the target N3IWF-UP for the user plane.

In some embodiments, setting up the endpoint-separated data IPSEC SA comprises cloning the IKE SA to set up an endpoint-separated data IPSEC SA and data IPSEC tunnel for the user plane.

In some embodiments, setting up the endpoint-separated data IPSEC SA comprises using an existing signaling IPSEC tunnel SA to set up an endpoint-separated data IPSEC SA and data IPSEC tunnel for the user plane.

According to another aspect of the present disclosure, a method for UPS and UPL for 5G non-3GPP access and implemented in a N3IWF-UP node comprises: receiving from a N3IWF a session setup request, the request comprising at least one of an IPSEC SA, a key, or a Security Parameter Index (SPI) associated with a UE; and sending to the N3IWF a session setup response.

According to another aspect of the present disclosure, a method for UPS and UPL for 5G non-3GPP access and implemented in a UE comprises: establishing a signaling Transport Layer Security Protocol (TLS) tunnel with a N3IWF; negotiating with the N3IWF to support UPS; generating an Extended Master Session Key (EMSK) to be used for data TLS tunnel setup; receiving from the N3IWF the address of a selected N3IWF-UP; and establishing a data TLS tunnel with the selected N3IWF-UP using the EMSK.

According to another aspect of the present disclosure, a method for UPS and UPL for 5G non-3GPP access and implemented in a N3IWF node comprises: establishing a signaling TLS tunnel with a UE; negotiating with the UE to support UPS; retrieving from the core network an EMSK to be used for data TLS tunnel setup; identifying a selected N3IWF-UP; providing to the UE an address of the identified N3IWF-UP; and providing to the identified N3IWF-UP the EMSK.

According to another aspect of the present disclosure, a method for UPS and UPL for 5G non-3GPP access and implemented in a N3IWF-UP comprises: receiving from a N3IWF a session setup request, the request containing an EMSK to be used for data TLS tunnel setup with a UE; establishing a data TLS tunnel with the UE; and establishing a PDU session with a SMF.

According to another aspect of the present disclosure, a method for UPS and UPL for 5G non-3GPP access and implemented in a UE comprises: establishing an IKE SA with a N3IWF and indicating to the N3IWF that IKE SA redirection is supported; receiving from the N3IWF a request to redirect the IKE SA to a N3IWF-UP; and redirecting the IKE SA to be associated with the N3IWF-UP instead of the N3IWF.

According to another aspect of the present disclosure, a method for UPS and UPL for 5G non-3GPP access and implemented in a N3IWF comprises: establishing an IKE SA with a UE; identifying a N3IWF-UP; and sending to the UE a request to redirect the IKE SA to the identified N3IWF-UP.

According to another aspect of the present disclosure, a method for UPS and UPL for 5G non-3GPP access and implemented in a SMF comprises: receiving a request to create a Session Management (SM) context; selecting a UPF node having a N3IWF-UP, capability; sending to the selected UPF node a session setup request, the request comprising a preliminary Packet Detection Rule (PDR) for core network traffic.

According to another aspect of the present disclosure, a method for UPS and UPL for 5G non-3GPP access and implemented in a Non-3GPP Interworking Function, N3IWF, node, the method comprising: receiving a PDU session request, the request comprising QoS Flow—PDR binding information; sending to a N3IWF-UP a session setup request; and receiving from the N3IWF-UP a session setup response.

In some embodiments, the session setup request comprises a preliminary PDR for access network traffic, the preliminary PDR having been generated by the N3IWF.

According to another aspect of the present disclosure, a method for UPS and UPL for 5G non-3GPP access and implemented in a N3IWF-UP node comprises: correlating a preliminary PDR for core network traffic with a preliminary PDF for access network traffic to create a full PDF.

In some embodiments, the preliminary PDR for core network traffic was received from a SMF in a session setup request or was generated by the N3IWF-UP.

In some embodiments, the preliminary PDR for access network traffic was received from a N3IWF in a session setup user request or was generated by the N3IWF-UP.

According to another aspect of the present disclosure, a method for UPS and UPL for 5G non-3GPP access and implemented in a N3IWF node comprises: receiving from a UE a PDU session establishment request; selecting a N3IWF-UP with UPF capability; sending UP information to a SMF; receiving from the SMF a QoS Profile and a QoS Flow—PDR binding; and sending to the selected N3IWF-UP a session setup request.

In some embodiments, the session setup request comprises a preliminary PDR for access network traffic.

According to another aspect of the present disclosure, a method for UPS and UPL for 5G non-3GPP access and implemented in an Access and Mobility Management Function (AMF) comprises: receiving from a N3IWF a PDU session establishment request, the request containing information identifying a N3IWF-UP with UPF capability; and sending to a SMF a create SM context request, the request containing the information identifying a N3IWF-UP with UPF capability.

According to another aspect of the present disclosure, a method for UPS and UPL for 5G non-3GPP access and implemented in a SMF node comprises: receiving from an AMF a request to create an SM context, the request identifying a N3IWF-UP node with UPF capability; negotiating security authorization for access with the identified N3IWF-UP node with UPF capability; sending to the identified N3IWF-UP node with UPF capability a request to setup a session, the request including a preliminary PDF for core network traffic.

According to another aspect of the present disclosure, a method for UPS and UPL for 5G non-3GPP access and implemented in a N3IWF-UP node comprises: receiving from a SMF a first session setup request comprising a preliminary PDR for core network traffic; receiving from a N3IWF a second session setup request comprising a preliminary PDR for access network traffic; and correlating the preliminary PDR for core network traffic with the preliminary PDR for access network traffic to create a full PDR.

According to another aspect of the present disclosure, a method for UPS and UPL for 5G non-3GPP access and implemented in a N3IWF-UP node comprises: receiving from a SMF a first session setup request; receiving from a N3IWF a second session setup request; wherein at least one of the first session setup request and the second session setup request comprises a first preliminary PDR and wherein the N3IWF-UP generates a second preliminary PDR; and correlating a the first and second preliminary PDR to create a full PDR.

According to another aspect of the present disclosure, a method for UPS and UPL for 5G non-3GPP access and implemented in a SMF node comprises: sending to a user plane node a per QoS Flow preliminary PDR for core network traffic; and sending to a N3IWF a QoS Flow—PDR binding and a QoS profile.

According to another aspect of the present disclosure, a method for UPS and UPL for 5G non-3GPP access and implemented in a N3IWF node comprises: receiving from a SMF a QoS Flow—PDR binding and a QoS profile; generating a per QoS Flow preliminary PDR for access network traffic; and sending to a user plane node the per QoS Flow preliminary PDR for access network traffic.

According to another aspect of the present disclosure, a method for UPS and UPL for 5G non-3GPP access and implemented in a N3IWF-UP node comprises: receiving from a SMF a per QoS Flow preliminary PDR for core network traffic; receiving from a N3IWF a per QoS Flow preliminary PDR for access network traffic; and correlating the per QoS Flow preliminary PDR for core network traffic with the per QoS Flow preliminary PDR for access network traffic to generate a full PDR.

According to another aspect of the present disclosure, a method for UPS and UPL for 5G non-3GPP access and implemented in a SMF node comprises: sending to a N3IWF with UPF capability a per QoS Flow preliminary PDR for core network traffic; and sending to the N3IWF with UPF capability a QoS Flow—PDR binding and a QoS profile.

According to another aspect of the present disclosure, a method for UPS and UPL for 5G non-3GPP access and implemented in a N3IWF-UP node with UPF capability, the method comprising: receiving from a SMF a per QoS Flow preliminary PDR for core network traffic; receiving from the SMF a QoS Flow—PDR binding and a QoS profile; generating a per QoS Flow preliminary PDR for access network traffic; correlating the per QoS Flow preliminary PDR for core network traffic with the per QoS Flow preliminary PDR for access network traffic to generate a full PDR.

According to another aspect of the present disclosure, a UE comprises a radio interface and circuitry configured to perform any of the UE methods disclosed herein.

According to another aspect of the present disclosure, a N3IWF comprises a network interface and circuitry configured to perform any of the N3IWF methods disclosed herein.

According to another aspect of the present disclosure, a N3IWF-UP comprises a network interface and circuitry configured to perform any of the N3IWF-UP methods disclosed herein.

According to another aspect of the present disclosure, a SMF comprises a network interface and circuitry configured to perform any of the SMF methods disclosed herein.

According to another aspect of the present disclosure, an AMF comprises a network interface and circuitry configured to perform any of the AMF methods disclosed herein.

According to another aspect of the present disclosure, a communication system including a host computer comprises: a communication interface configured to receive user data originating from a transmission from a UE to a base station, wherein the UE comprises a radio interface and processing circuitry configured to perform any of the UE methods described herein.

In some embodiments, the communication system further includes the UE.

In some embodiment, the communication system further includes the base station, wherein the base station comprises a radio interface configured to communicate with the UE and a communication interface configured to forward to the host computer the user data carried by a transmission from the UE to the base station.

In some embodiments, the processing circuitry of the host computer is configured to execute a host application, and the UE's processing circuitry is configured to execute a client application associated with the host application, thereby providing the user data.

In some embodiments, the processing circuitry of the host computer is configured to execute a host application, thereby providing request data; and the UE's processing circuitry is configured to execute a client application associated with the host application, thereby providing the user data in response to the request data.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 21 is a flowchart illustrating a method implemented in a communication system in accordance with one embodiment on the present disclosure; and FIG. 22 is a flowchart illustrating a method implemented in a communication system in accordance with one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW or PGW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
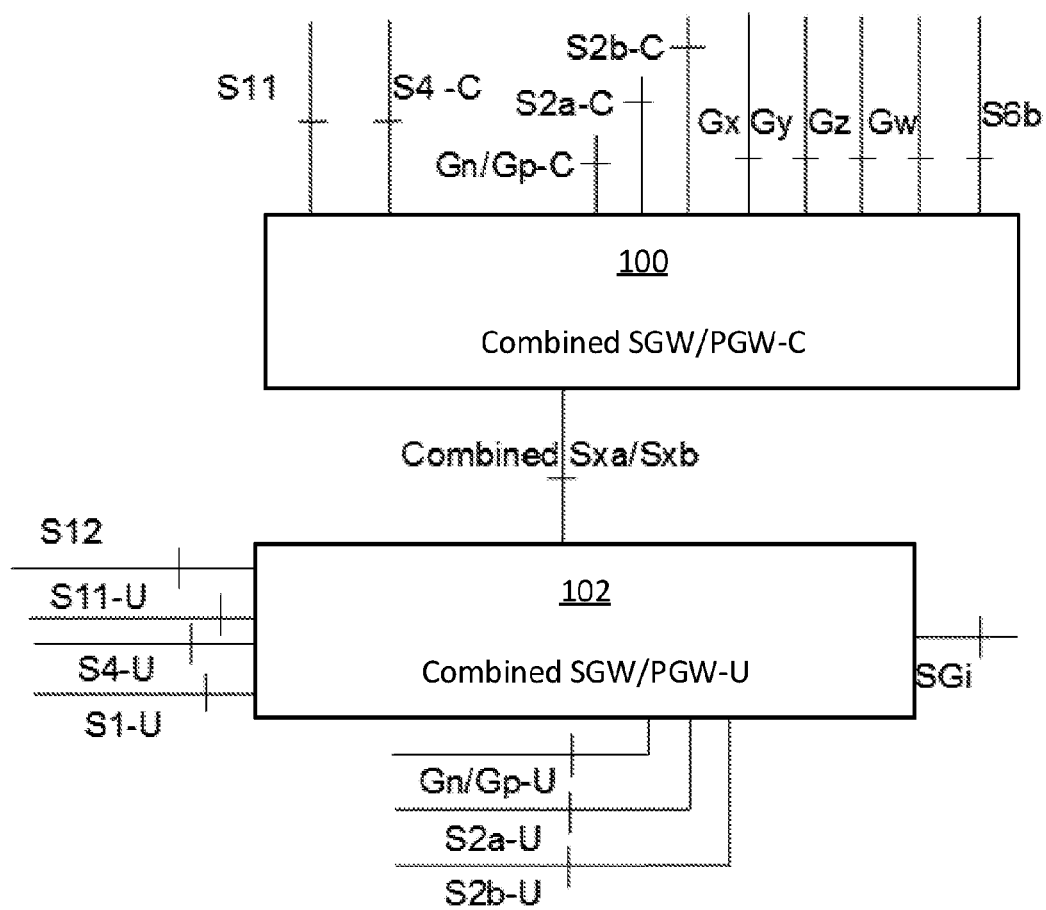
FIG. 1 illustrates control plane/user plane separation in a conventional Evolved Packet Core (EPC) network.
Figure 2:
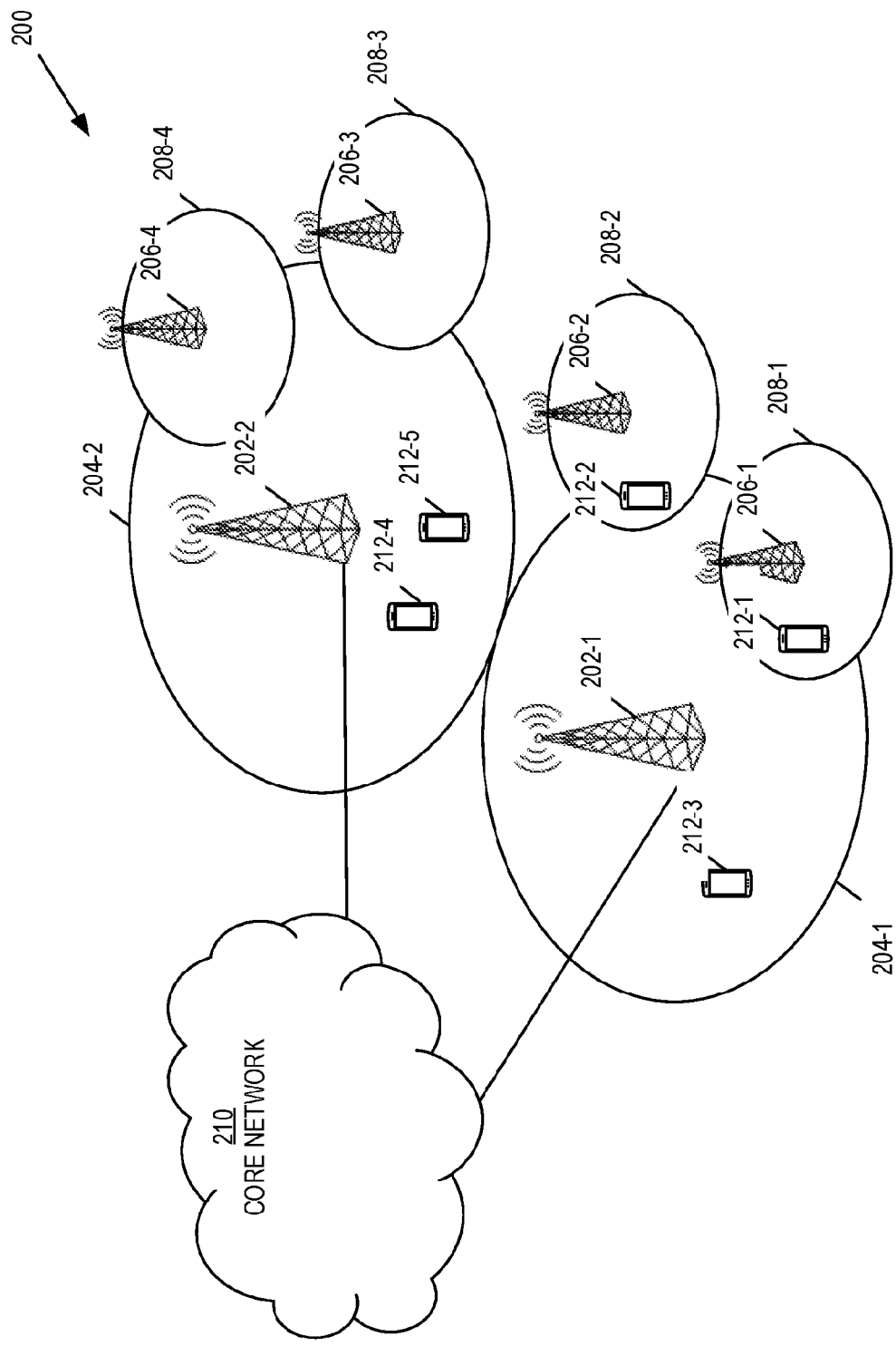
FIG. 2 illustrates one example of a Fifth Generation (5G) telecommunications communications network that operates according to some embodiments of the present disclosure.

FIG. 2 illustrates one example of a communications network 200 that operates according to some embodiments of the present disclosure. In the embodiments described herein, the cellular communications network 200 is a Fifth Generation (5G) New Radio (NR) network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 also includes a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Non-3GPP Access

Figure 3:
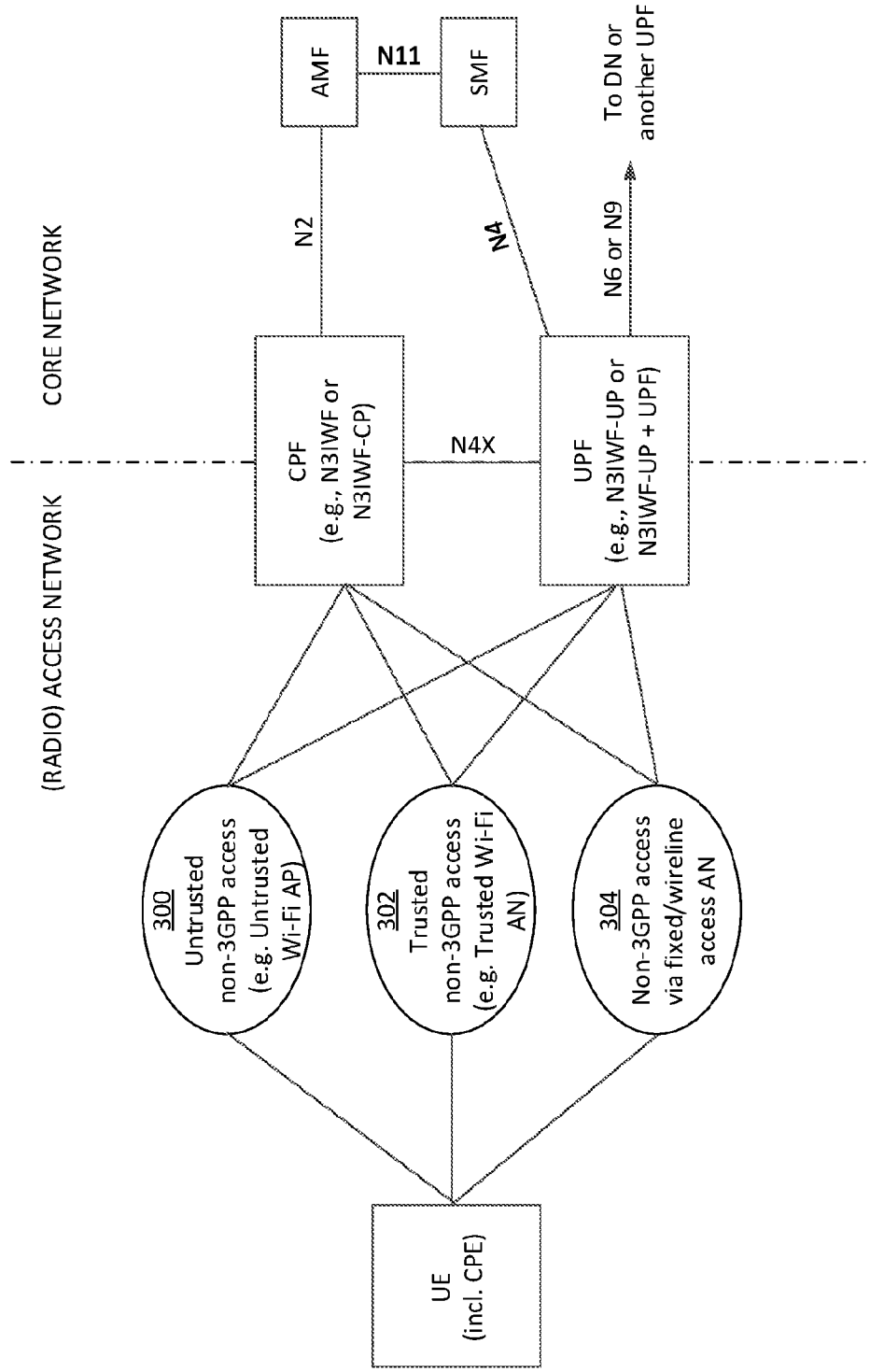
FIG. 3 illustrates different types of non-Third Generation Partnership Project (3GPP) access in an example 5G network.

FIG. 3 illustrates different types of non-3GPP access in an example 5G network, which defines an entity known as the Non-3GPP Interworking Function (N3IWF) that acts as the gateway into the 5G Core Network (5GC). The embodiment illustrated in FIG. 3 is of a 5G network that supports UPS, e.g., where the N3IWF may be logically divided into separate Control Plane (CP) and User Plane (UP) entities. In FIG. 3, a UE communicates through a CPF and a UPF to get to core network functions such as an Access and Mobility Management Function (AMF) and a Session Management Function (SMF).

In the embodiment illustrated in FIG. 3, the CPF may be, for example, a N3IWF (having both CP and UP functions together) or it may be a N3IWF-Control Plane (N3IWF-CP) entity. The CPF may communicate with the AMF via the N2 interface. The UPF may be, for example, a N3IFW-User Plane (N3IWF-UP) or it may be an N3IWF-UP that also performs User Plane Functions (UPF). The UPF may communicate with the CPF via the N4x interface and may communicate with the SMF via the N4 interface. The UPF may communicate with the data network or another UPF via the N6 or N9 interface(s). The AMF may communicate with the SMF via the N11 interface.

Conceptually, non-3GPP access may be divided into wireless versus wireline (also known as "fixed") and may be divided into trusted versus untrusted. FIG. 3 illustrates three specific types of non-3GPP access that a UE may use to connect to the 5G core network: untrusted non-3GPP access 300; trusted non-3GPP access 302; and fixed or wireline non-3GPP access 304.

Although untrusted non-3GPP access 300 and trusted non-3GPP access 302 were early defined in 3GPP for Fourth Generation (4G) network, see [18], in which a UE communicates with the Evolved Packet Core (EPC) via an evolved Packet Data Gateway (ePDG), the 5G 3GPP Phase 1 definition only addresses untrusted non-3GPP access 300 (with trusted non-3GPP access 302 to be addressed at some point in the future), and doesn't define how to implement UPS for non-3GPP access at all.

For untrusted non-3GPP access 300, Internet Key Exchange (IKE) [6] and Internet Protocol Security (IPSEC) are used between UE and ePDG/N3IWF for establishing secure connectivity. For 5G untrusted non-3GPP access, Non-Access Stratum (NAS) signaling is introduced to support 5G registration and Protocol Data Unit (PDU) session setup. Between the UE and the N3IWF, the NAS signaling messages are transported through IKE message exchanges during the IKE Security Association (SA) establishment and transported through an IPSEC tunnel after first IPSEC SA establishment. IKE itself does not interpret 5G NAS signaling, but is responsible for user plane setup (IPSEC tunnel establishment) between the UE and N3IWF for a PDU session.

For trusted non-3GPP access 302, a UE will establish connectivity towards a Trusted WLAN Access Gateway (TWAG)/N3IWF by using specified Access Stratum (AS) control protocol and 5G NAS signaling runs over the AS control protocol between the UE and the TWAG/N3IWF.

In addition, fixed or wireline access 304 will be an important non-3GPP access into the 5G network. A 3GPP study on 5G Wireless and Wireline Convergence (WWC) is ongoing, see [5]. In the current Broadband Forum (BBF) document, the fixed access end device (e.g., a Customer Premises Equipment (CPE) or a UE behind a CPE) connects to the 5G core network through a gateway named an Access Gateway Function (AGF) which is similar to the TWAG in the trusted non-3GPP access model, see [16] for details about the BBF study. As in the trusted non-3GPP access, the UE will establish connectivity towards the AGF/N3IWF by using a specified AS control protocol, and 5G NAS signaling runs over the AS control protocol between the UE and the AGF/N3IWF.

User Plane Local Offloading

User Plane Local offloading (UPL) is a basic requirement in a 5G network for delay-sensitive connectivity application or use cases such as Mobile Edge Computing (MEC). In MEC, the UPF or its traffic steering function is usually deployed in the access network side or edge. For an N3IWF that does not support UPS, then the N3IWF as a whole is required to be deployed locally. For an N3IWF that supports UPS, then the N3IWF-UP will be deployed locally.

UPS/UPL with Non-3GPP Access

The combination of UPS/UPL with Non-3GPP access is not well defined for 5G networks. However, the following are some scenarios that require or would benefit from UPS for 5G non-3GPP access:

Scenario (A): to distribute N3IWF-UPs separate from a centralized N3IWF-CP, each N3IWF-UP located close to a UE point of access or access network. The latest definition in 3GPP standard allows a UE to select an ePDG with regard to the ePDG current location in its cellular network (identified by Routing Area Identity (RAI)/Location Area Identity (LAI)), but the RAI/LAI is often impossible to retrieve, or out of date, or inapplicable for use (e.g., in roaming case). In current Wi-Fi Calling (VoWiFi) networks, the ePDG still widely centralized deployed. This situation will cause the creation of a non-optimized user plane path, especially when a UPF or PGW-UP is already deployed locally.

Scenario (B): to have a N3IWF-UP function collocated with a UPF to reduce the number of hops in the user plane path. This deployment is useful for delay-sensitive connectivity applications or use cases, such as mobile edge computing (MEC). An individual N3IWF if deployed will bring surplus traffic forwarding delay. When an N3IWIF-UP is separated from the N3IWF-CP and collocated in a UPF, then the user plane function (such as IPSEC) will be separated from the N3IWF/N3IFW-CP and implemented together with the UPF or will result in a unified UPF.

Scenario (C): the SDN and cloud-based fixed or wireline broadband network is becoming the trend in the fixed broadband network upgrade evolution where an AGF or N3IWF will be deployed in the SDN and cloud-based data center with Control Plane and Forwarding Plane separated.

Scenario (D): when a UE moves across the points of access (e.g., Wi-Fi AP) in the non-3GPP access, a new N3IWF may appear that is more appropriate for the new point of access in the user plane path. However, if the N3IWF includes both CP and UP functions, then the whole N3IWF will need to be relocated. In contrast, where the N3IWF-CP and N3IWF-UP are decoupled or separate, this provides the possibility to relocate only the N3IWF-UP only while keeping end to end signaling simply re-established on the unchanged N3IWF-CP.

Scenario (E): Well-known SDN benefits, such as user plane load-balancing and individual deployment to meet scalability, are generally applicable and may be more flexible since the CP and UP nodes may be deployed or adjusted independently of each other.

Use Case: MEC in the 5G Network

As mentioned in the ETSI MEC introduction [17], MEC (Mobile Edge Computing or Multi-access Edge Computing) offers application developers and content providers cloud-computing capabilities and an IT service environment at the edge of the mobile network. The IT service environment offered by MEC is characterized by proximity, ultra-low latency, high bandwidth, real-time access to radio network information and location awareness. MEC provides a new ecosystem and value chain. Operators can create new revenue streams by exposing their Radio Access Network (RAN) edge to authorized third-parties for application hosting and providing RAN-based services, allowing them to flexibly and rapidly deploy innovative applications and services towards mobile subscribers, enterprises and vertical segments. More MEC specifications can be found in www.etsi.org/technologies-clusters/technologies/multi-access-edge-computing.

The 3GPP standards body has considered MEC in the 5G network definition, including, for example, user plane breakout, Application Function (AF) influence traffic routing and network capability exposure (e.g., via a Network Exposure Function (NEF)). Particularly for user plane breakout, the 3GPP defines a UL Classifier (UL CL) and a IPv6 multihoming Branching Point (BP) UPF as well as anchor UPF relocation.

Conventional Technologies with Regard to IPSEC User Plane Separation and Relocation The SDN-based IPSEC [11] introduces a conceptual design and two scenarios on how IPSEC may be used in an SDN network:

Scenario-1 has both IKE and IPSEC Encapsulating Security Payload (ESP) in the user plane while in the control plane, an SDN controller only provides high level control such as SPD and credentials.

Scenario-2 has IKE and IPSEC ESP separated with IKE located in SDN controller to control IPSEC ESP which is implemented in user plane.

The IKE multihoming specification [10] states a method to support IKE multihoming. One or both peers of IKE support multihoming by multiple interfaces in one node or in multiple nodes. There are multiple IPSEC tunnel connections, each of which having a different pair of IPSEC endpoints having a different IPSEC SA but sharing the same IKE SA.

MOBIKE [9], in addition to supporting IKE mobility, also supports multihoming as well in the security gateway side. The mobile device can select one of the available multihoming interfaces of the anchored security gateway with which to attach.

The IKE clone [8] also addresses multihoming issues by cloning an IKE SA for the additional connection, and, by means of the MOBIKE method, moving the created IKE SA and corresponding IPSEC SAs to the given endpoints of given connection.

In IKE redirection [7], the UE is redirected to connect to another security gateway that is proposed by the original security gateway. Indicated with the redirection, the end device will delete the connection with the original security gateway, if any, and set up full IKE procedures to establish all security associations with the new security gateway from the beginning.

Problems with Existing Solutions

One problem with the current 3GPP standard is that it doesn't define UPL and UPS for non-3GPP access. This is a problem because UPS and especially UPL to the Access Network (AN) is important to support MEC as required for 5G non-3GPP access.

One problem with the current 3GPP Control Plane and User Plane Separation (CUPS) definition and 5G UPS architecture is that each UP node is controlled by one and only one given CP node. There is no one single UP model where two or more CP nodes to control one single UP node. Having one single UP model would be quite useful to eliminate a possible extra hop, e.g., if the UP function can be integrated into the AN.

One problem with the existing 5G UL CL/BP model is that the local UP function is still an individual implementation node, not integrated into an AN for local breakout.

As for UPS for untrusted non-3GPP access, currently the IKE/IPSEC standard didn't consider IKE/IPSEC separation, and the IPSEC ESP must implicitly use the same endpoints as those used for the IKE signalling. Existing Internet Engineering Task Force (IETF) standard specifications or drafts that are somehow related to IPSEC UP separation address different aspects and use cases, and are not directly used for UPS for untrusted non-3GPP access in 5G network. For example:

SDN-based IPSEC [11] gives a conceptual introduction for IPSEC UP separation but does not provide any detailed solution method and procedures;

The IKE multihoming specification [10] focuses on multiple paths of IPSEC which share same IKE SA;

The MOBIKE specification [9] supports IKE mobility among multihoming endpoints;

The IKE clone specification [8] supports IKE clone and allow endpoints addition on cloned IKE; and The IKE redirection specification [7] may be referred to relocate N3IWF to support traffic local offloading. However, there is no 3GPP definition on how to use the IKE redirection could be used for 5G non-3GPP access.

The present disclosure provides solution methods to support User Plane Local Offloading (UPL) for non-3GPP access in the 5G network and support User Plane Separation (UPS) for N3IWF. The 5G non-3GPP access in the present disclosure includes untrusted non-3GPP access, trusted non-3GPP access, and non-3GPP fixed access.

The present disclosure gives a general principle for UE interworking with a UPS-based N3IWF. In one embodiment, for untrusted non-3GPP access including untrusted fixed access, the present disclosure presents designs and procedures based on an extension of Internet Key Exchange (IKE) and Transport Layer Security (TLS) which includes: (1) IKE clone and relocation method and procedures; (2) IPSEC endpoint separation method and procedures: (3) TLS-based method and procedures.

The present disclosure also presents one "single UP" (also referred to as "ONE UP") model for UPL. For UP separated 5G non-3GPP access, it presents combining N3IWF-UP and UPF as one single implementation node and it provides designs to support using two CPs to control one UP, with an implementation method that includes correlating per Quality of Service (QoS) Flow Preliminary Packet Detection Rules (PDRs) respectively from N3IWF and SMF. The present disclosure includes solution procedures to combine a N3IWF-UP function into a UPF node and to combine a UPF to a N3IWF-UP node, respectively corresponding to typical untrusted and trusted/fixed access situations.

For UP unseparated non-3GPP access, the present disclosure provides an IKE-based N3IWF redirection solution.

1 GENERAL UPS METHOD PRINCIPLE FOR NON-3GPP ACCESS

When a N3IWF-UP has been selected, the endpoint information of the N3IWF-UP is signaled to the UE during PDU session setup. The endpoint information provided to the UE usually includes an Internet Protocol (IP) address and/or a Medium Access Control (MAC) address.

After PDU session setup and N3IWF-UP endpoint information retrieved, the UE can transfer user plane payload through data path between UE and N3IWF-UP The data path for user payload transfer may be IPSEC tunnel, TLS tunnel as stated in the following section 2.1, section 2.2, section 3, and section 4 of the present disclosure. It may be based on any other L2 or L3, L4 tunnel or transport technologies.

2 IPSEC BASED UPS METHOD AND PROCEDURES

This solution is applicable in untrusted non-3GPP access including untrusted fixed access where the IPSEC tunnel is used for UP payload transfer between UE and N3IWF-UP.

See following sub-section about detail statement.

2.1 IKE Clone and Relocation Methods and Procedures

Figure 4:
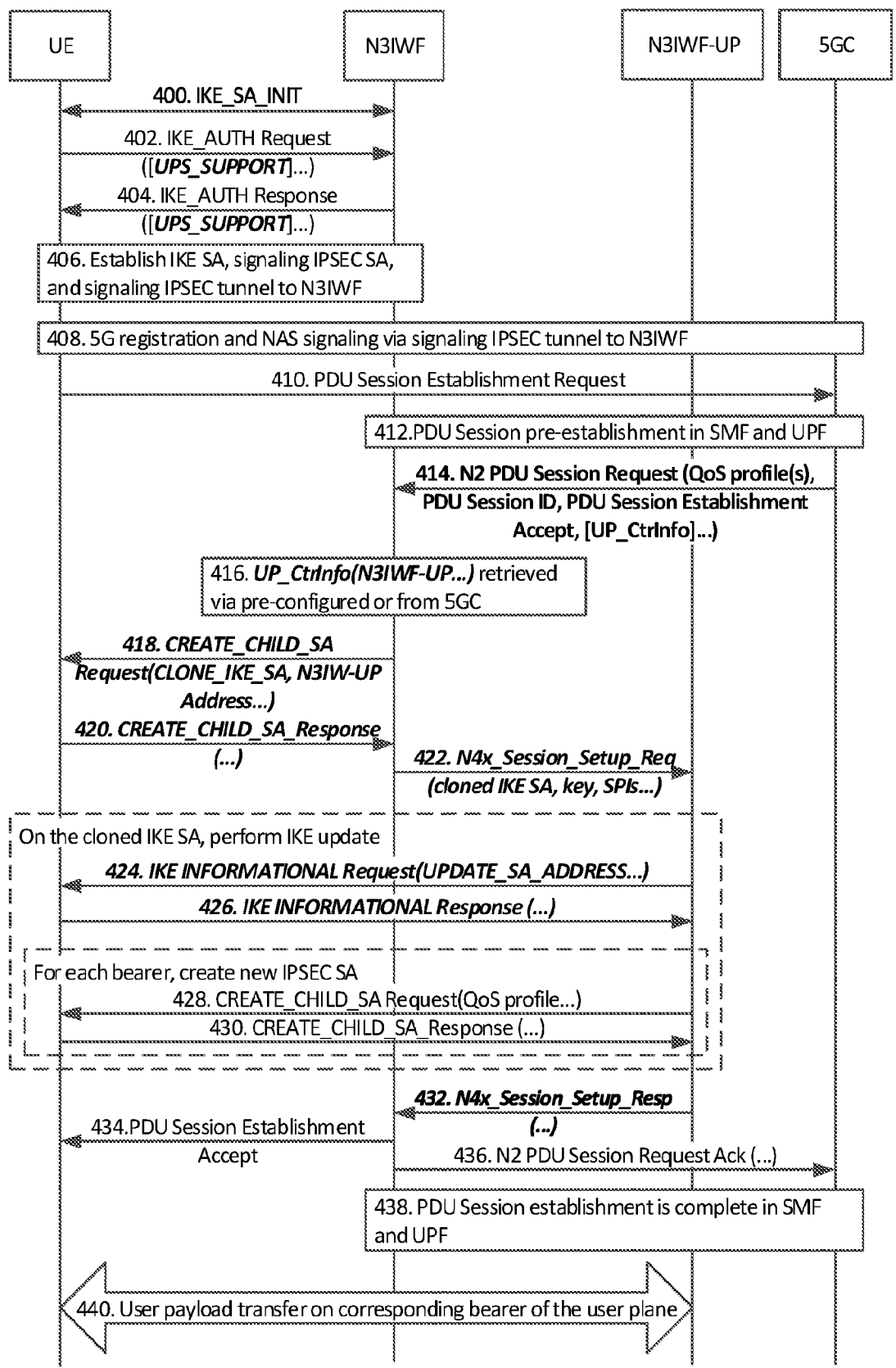
FIG. 4 illustrates a method for UPS and UPL for 5G non-3GPP access that includes Internet Key Exchange (IKE) cloning and relocation according to an embodiment of the present disclosure.

FIG. 4 illustrates a method for UPS and UPL for 5G non-3GPP access that includes IKE cloning and relocation according to an embodiment of the present disclosure. In the embodiment illustrated in FIG. 4, a UE and N3IWF initiate an IKE SA negotiation (step 400), which includes a request for IKE authorization (step 402) and a response to that request (step 404). In the IKE_AUTH exchange shown in steps 402 and 404, the UE and N3IWF negotiate to support UPS (see also definition in section 15.1 of the present disclosure). In one embodiment, both of them negotiate to support IKE clone and MOBIKE related procedures as defined in [8] and [9] unless otherwise specified and extended as in the following.

As according to 5G procedure [2], the IKE_AUTH exchange is used to create a first IPSEC SA, also referred to herein as a signaling IPSEC SA and which may also be referred to herein as a signaling IPSEC tunnel (step 406), which is used for NAS signaling transfer between the UE and N3IWF (step 408). Through NAS signaling, UE initiates PDU session establishment towards the SMF (step 410). During PDU session establishment (step 412), the user plane of N3IWF (N3IWIF-UP) is assigned for the PDU Session. The UP information is conveyed to the N3IWF (step 414). The N3IWF then retrieves the IP address of the N3IWF-UP (step 416).

To signal the N3IWF-UP IP address to the UE and have UE to interwork with the N3IWF-UP, the N3IWF implements an IKE clone with the UE. In the embodiment illustrated in FIG. 4, this occurs when the N3IWF sends to the UE an IKE CREATE_CHILD_SA request message (step 418), which includes CLONE_IKE_SA Notification (see the definition in section 6 in IKE Clone [8]). In this message, the N3IWF also provides the UE with the address of the N3IWF-UP via ADDITIONAL_IP4_ADDRESS or ADDITIONAL_IP6_ADDRESS Notification (see the definition in section 4.2.2 in MOBIKE [9]). The UE responds with an IKE CREATE_CHILD_SA response message (step 420).

In the embodiment illustrated in FIG. 4, the N3IWF then sends a N4x_SESSION_SETUP_REQUEST message to the N3IWF-UP (step 422) using the cloned IKE SA, and other parameters, such as the key, a Security Parameter Index (SPI), etc. To support the IPSEC endpoint separation within N3IWF, in some embodiments, the N3IWF provides the N3IWF-UP with a data IKE SA, a N3IWF IKE SPI, a UE IKE SPI, and a key. In some embodiments, this information is provided through an implementation-specific protected N4x interface.

Then, on the cloned IKE SA, the N3IWF-UP initiates an IKE SA update with the UE, e.g., by sending an IKE INFORMATIONAL request message (step 424) t the UE, the message including UPDATE_SA_ADDRESSES Notification (see the definition in section 4.2.4 in MOBIKE [9]). When the UE sends back an IKE INFORMATIONAL response message (step 426), the cloned IKE is successfully moved to exist between UE and N3IWF-UP.

On the cloned and relocated IKE SA, the N3IWF-UP then creates one or more data IPSEC tunnels with the UE for separated user plane of the PDU session. In the embodiment illustrated in FIG. 4, this is implemented by the N3IWF-UP sending an IKE CREATE_CHILD_SA request message (step 424) as defined by TS 23.502. And the IPSEC tunnel is successfully created when the UE acknowledges the N3IWF-UP by sending back the corresponding IKE CREATE_CHILD_SA response message (step 426). This may be performed for each bearer.

In the embodiment illustrated in FIG. 4, the N3IWF-UP then sends a N4x_SESSION_SETUP_RESPONSE message (step 432) back to the N3IWF, and the N3IWF sends a PDU Session Establishment Accept message back to the UE (step 434). The N3IWF sends an N2 PDU Session Request Acknowledgement to the SMF (step 436), and the PDU Session Establishment is complete in the SMF and UPF (step 438). From that point, the UE may engage in user payload transfer on a corresponding bearer of the user plane (step 400).

2.2 IPSEC Endpoint Separation Method and Procedures

Figure 5:
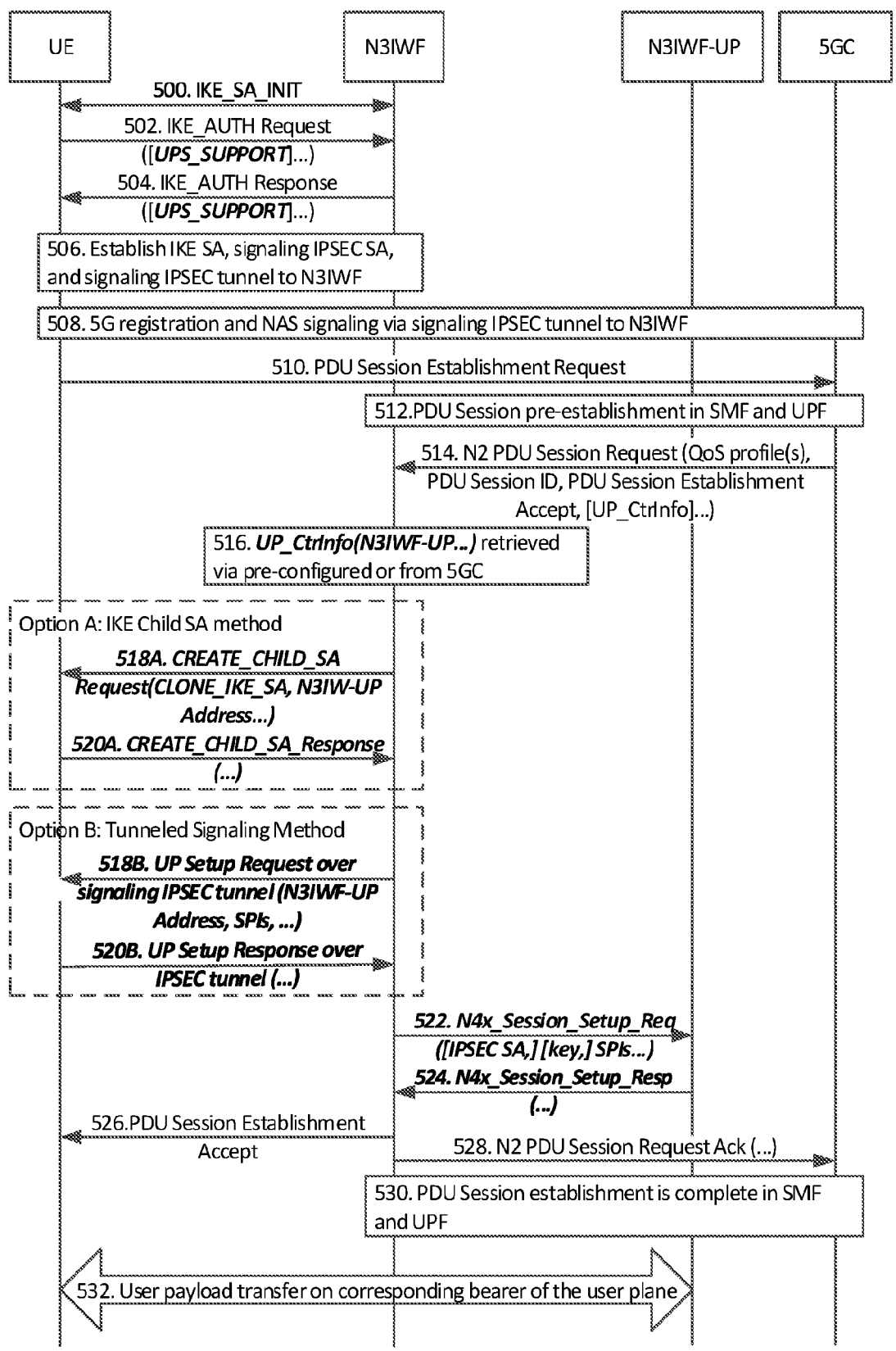
FIG. 5 illustrates a method for UPS and UPL for 5G non-3GPP access that includes Internet Protocol Security (IPSEC) endpoint separation according to an embodiment of the present disclosure.

FIG. 5 illustrates a method for UPS and UPL for 5G non-3GPP access that includes IPSEC endpoint separation according to an embodiment of the present disclosure. In the embodiment illustrated in FIG. 5, a UE and N3IWF initiate an IKE SA negotiation (step 500), which includes a request for IKE authorization (step 502) and a response to that request (step 504). In the IKE_AUTH exchange shown in steps 502 and 504, the UE and N3IWF negotiate to support UPS. The IKE_AUTH exchange is used to create a signaling IPSEC SA and a signaling IPSEC tunnel (step 506), which is used for registration and NAS signaling transfer between the UE and N3IWF (step 508). Through NAS signaling, UE initiates PDU session establishment towards the SMF (step 510). During PDU session establishment (step 512), the user plane of N3IWF (N3IWIF-UP) is assigned for the PDU Session. This information is conveyed to the N3IWF (step 514). The N3IWF then retrieves the IP address of the N3IWF-UP (step 516).

In the embodiment illustrated in FIG. 5, two approaches for signaling the N3IWF-UP IP address to the UE and allowing the UE to interwork with the UPS-based N3IWF are presented:

Approach 1 (using IKE signaling for separated user plane setup). In this approach, the N3IWF sends UE the IKE CREATE_CHILD_SA request message (step 518A) including the address of N3IWF-UP via ADDITIONAL_IP4_ADDRESS or ADDITIONAL_IP6_ADDRESS Notification (see the definition in section 4.2.2 in MOBIKE [9]) and uses the IKE CREATE_CHILD_SA exchange (steps 518A and 520A) to set up endpoint-separated data IPSEC SA and data IPSEC tunnel for user plane.

Approach 2 (using tunneled signaling for separated user plane setup). In this approach, the N3IWF uses tunneled signaling protocol running in the first signaling IPSEC tunnel to signal the N3IWF-UP IP address to UE (steps 518B and 520B) for endpoint-separated data IPSEC SA and data IPSEC tunnel setup in the user plane.

The first signaling IPSEC tunnel which has already been established can be used for NAS and other tunneled signaling transfer between the UE and the N3IWF. The specific steps to generate data IPSEC SA for the separated endpoint of N3IWF-UP is out of scope in the present disclosure definition. For example, to reuse the established first signaling IPSEC SA with the new endpoint and SPI information for the data IPSEC SA is a straightforward consideration.

To support the IPSEC endpoint separation within N3IWF, the N3IWF provides the N3IWF-UP with data IPSEC SA, N3IWF-UP ESP SPI, UE ESP SPI and key, particularly, through implementation-specific protected N4x interface (steps 522 and 524). The method illustrated in FIG. 5 continues with the N3IWF sending to the UE a PDU Session Establishment Accept message (step 526) and sending to the 5G core network an N2 PDU Session Request Acknowledgement (step 528). The PDU Session establishment is complete in the SMF and UPF (step 530), after which there can be user payload transfer on the corresponding bearer in the user plane (step 532).

3 TLS BASED-BASED UPS METHOD AND PROCEDURES

Figure 6:
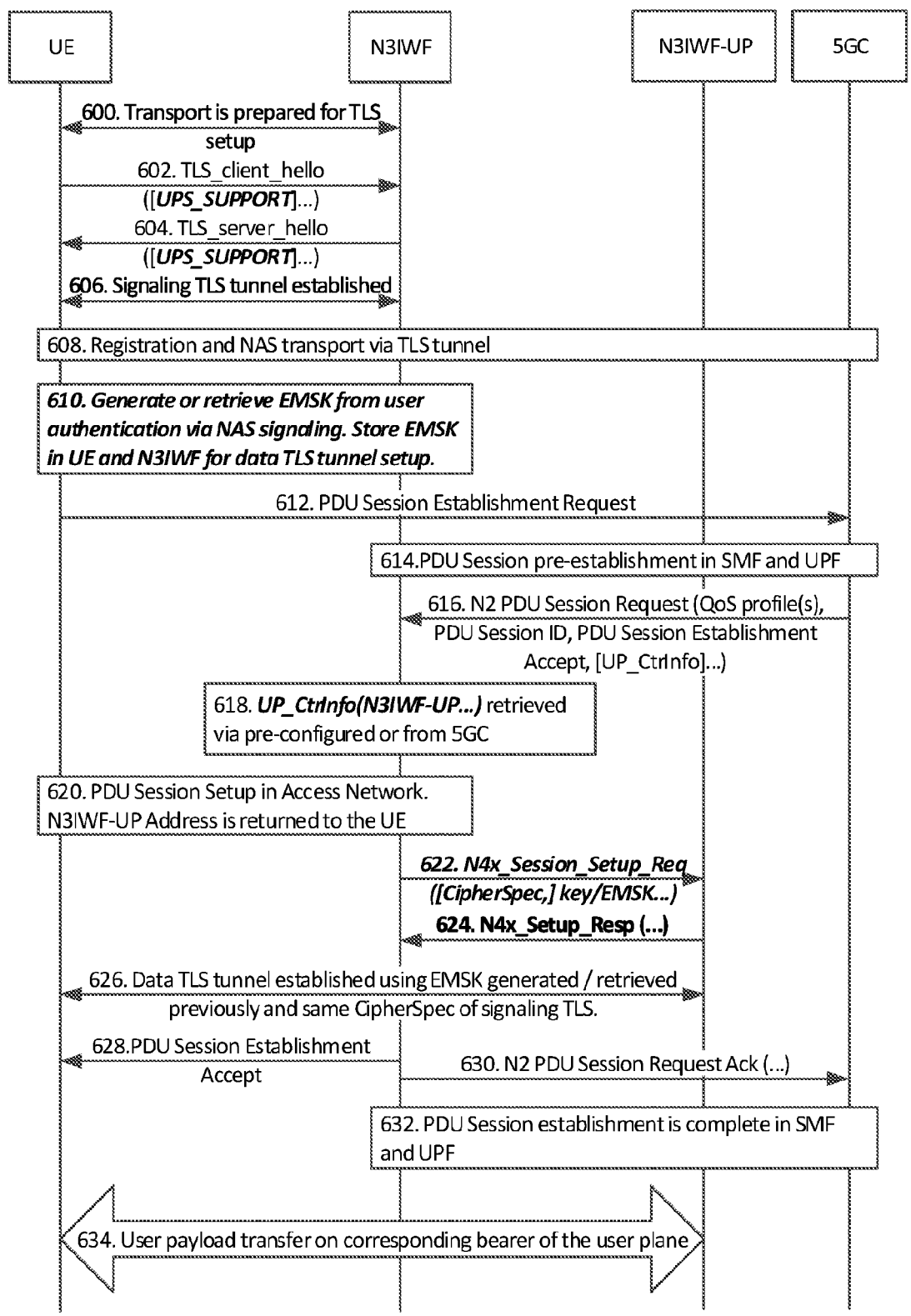
FIG. 6 illustrates a method for UPS and UPL for 5G non-3GPP access that includes TLS-based UPS according to an embodiment of the present disclosure.

FIG. 6 illustrates a method for UPS and UPL for 5G non-3GPP access that includes TLS-based UPS according to an embodiment of the present disclosure. This solution is applicable, for example, in untrusted non-3GPP access, including for untrusted fixed access where the TLS tunnel is used for UP payload transfer between UE and N3IWF-UP. In the embodiment illustrated in FIG. 6, the UE sets up a signaling TLS tunnel with the N3IWF for signaling transfer (step 600). During the signaling TLS tunnel setup, the UE and the N3IWF may negotiate to support UPS capability (steps 602 and 604). This is described in more detail in section 15.2 of the present disclosure. The UE and N3IWF may by default support UPS defined in this solution without explicit negotiation. After the TLS tunnel is established (step 606), it is used for registration, NAS signaling, and user authentication (step 608). After user authentication, the UE will generate by its own (or the N3IWF will retrieve from 5G core) an Extended Master Session Key (EMSK) which will be used for later data TLS tunnel setup (step 610). Section 15.3 of the present disclosure describes how EMSK is used for TLS setup.

In the embodiment illustrated in FIG. 6, the UE issues a PDU Session Establishment Request (step 612). During PDU session establishment (steps 614), the user plane of N3IWF (N3IWIF-UP) is assigned for the PDU Session. This information is conveyed to the N3IWF (step 616). The N3IWF then retrieves the IP address of the N3IWF-UP (step 618) and signals it to the UE during PDU Session Setup in the AN (step 620) using method-specific tunneled signaling transferred within the signaling TLS tunnel.

To support the UP endpoint separation within N3IWF, the N3IWF provides the N3IWF-UP with data TLS CipherSpec and key (EMSK), particularly, through implementation-specific protected N4x interface (steps 622 and 624).

With N3IWIF-UP IP address is received, the UE may then set up a data TLS tunnel with the N3IWIF-UP using the shared key stated previously (step 626). The specific steps to generate data TLS SA for the separated endpoint of N3IWF-UP is out of scope in the present disclosure definition. For example, to reuse the established signaling TLS SA with the new endpoint for the data TLS SA is a straightforward consideration. The method illustrated in FIG. 6 continues with the N3IWF sending to the UE a PDU Session Establishment Accept message (step 628) and sending to the 5G core network an N2 PDU Session Request Acknowledgement (step 630). The PDU Session establishment is complete in the SMF and UPF (step 632), after which there can be user payload transfer on the corresponding bearer in the user plane (step 634).

4 IKE BASED-BASED N3IWF REDIRECTION SOLUTION

Figure 7:
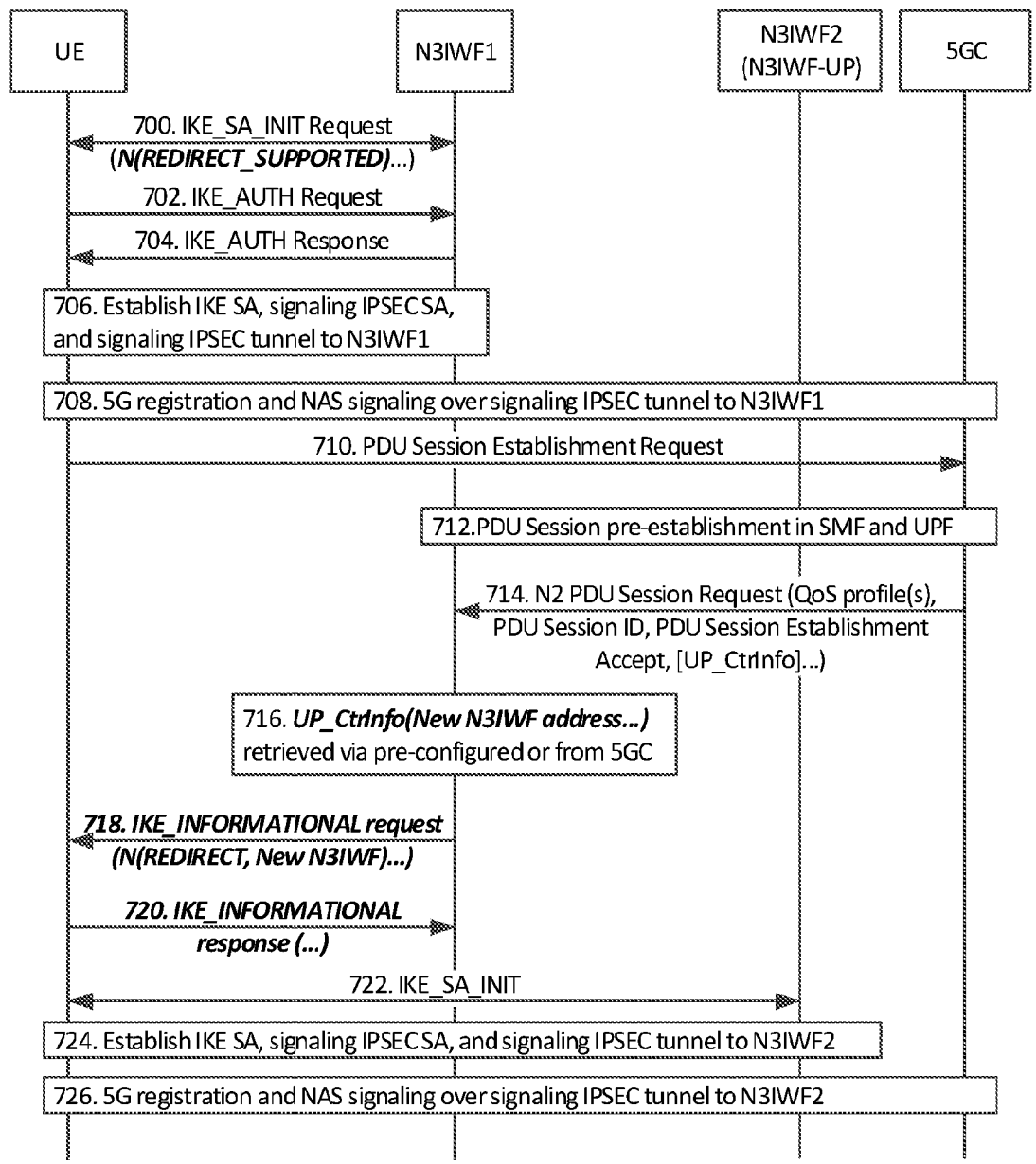
FIG. 7 illustrates a method for UPS and UPL for 5G non-3GPP access that includes IKE-based Non-3GPP Interworking Function (N3IWF) redirection according to an embodiment of the present disclosure.

FIG. 7 illustrates a method for UPS and UPL for 5G non-3GPP access that includes IKE-based N3IWF redirection according to an embodiment of the present disclosure. In the embodiment illustrated in FIG. 7, the UE does not support UPS. Thus, during the IKE_SA_INIT request (step 700), the UE may indicate to N3IWF1 that it supports IKE redirection. In the embodiment illustrated in FIG. 7, for example, the UE includes a Notify Payload (REDIRECT_SUPPORTED) for that purpose. See the Notify payload definition in section 9.1 in IKE redirection [7]. The IKE AUTH exchange (steps 702 and 704) is used to create a signaling IPSEC SA and a signaling IPSEC tunnel (step 706), which is used for 5G registration and NAS signaling transfer between the UE and N3IWF1 (step 708).

During the PDU session establishment process (steps 710, 712, 714, and 716), N3IWF1 determines the IP address of another N3IWF, N3IWF2, which will be the N3IWF with which the UE will establish a signaling IPSEC tunnel. In the embodiment illustrated in FIG. 7, the IP address of N3IWF2 is part of UP_Ctrinfo (step 716). The format of UP_Ctrinfo is described in more detail in section 16 of the present disclosure.

In the embodiment illustrated in FIG. 7, the N3IWF then initiates the IKE redirection with UE via IKE_INFORMATIONAL exchange (steps 718 and 720), which is described in section 5 of IKE redirection [7]. In the embodiment illustrated in FIG. 7, the UE then starts a new IKE session with the redirected N3IWF for 5G registration and PDU session (steps 722, 724, and 726).

The following are embodiments in which a N3IWF-UP function is combined or collocated with a UPF. Such an entity is herein referred to as a "ONE UP" entity, node, or function.

5 SET UP N3IWF-UP ON A SELECTED UPF NODE

Figure 8:
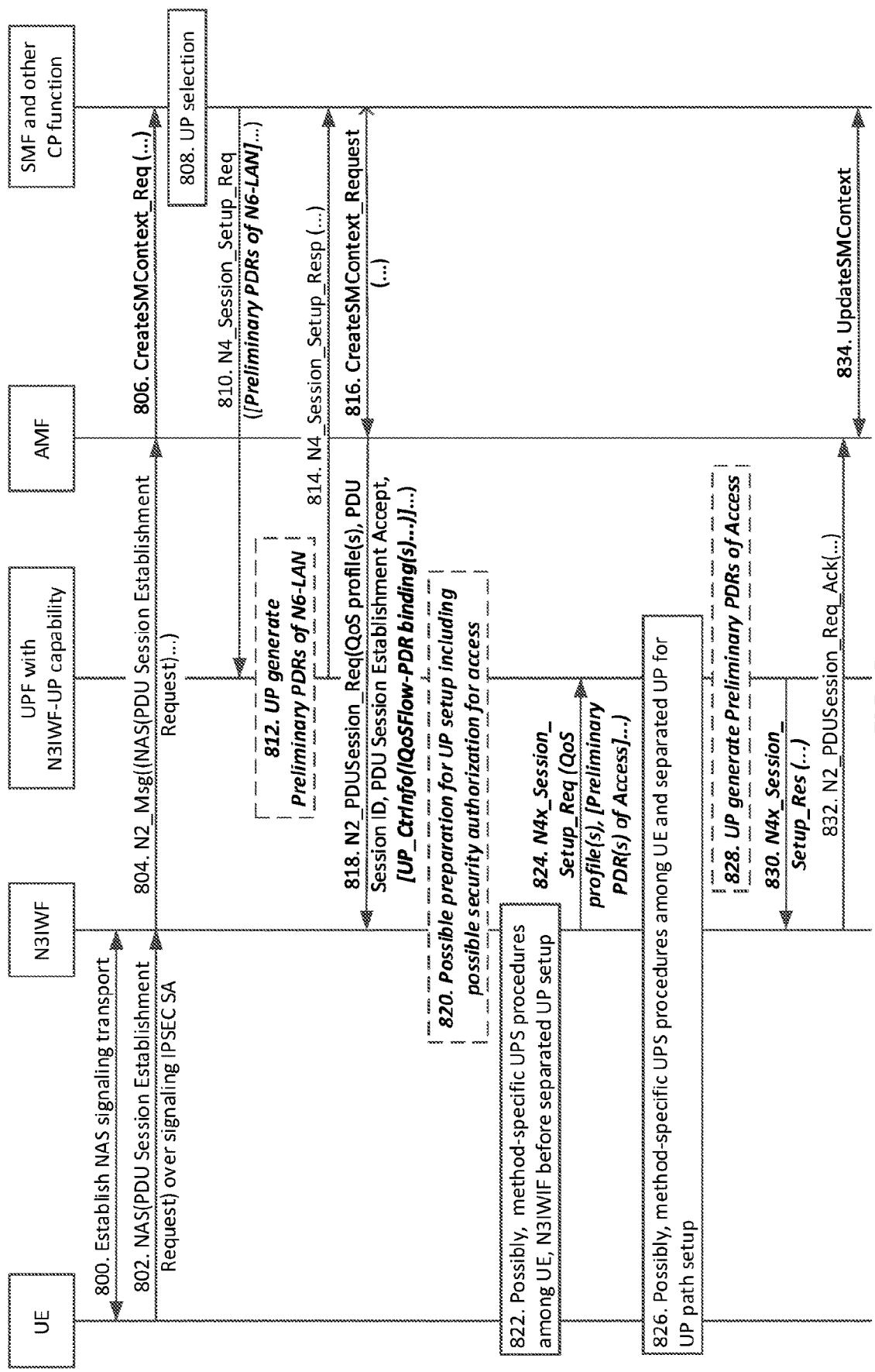
FIG. 8 illustrates a method for UPS and UPL for 5G non-3GPP access that includes setting up a N3IWF User Plane (N3IWF-UP) on a selected UPF node according to an embodiment of the present disclosure.

FIG. 8 illustrates a method for UPS and UPL for 5G non-3GPP access that includes setting up a N3IWF-UP on a selected UPF node according to an embodiment of the present disclosure. FIG. 8 illustrates a scenario in which two control plane functions (SMF and N3IWF) control a single user plane function (N3IWF-UP) as defined in section 7 of the present disclosure.

In many situations in the untrusted non-3GPP access, the N3IWF may not be responsible to select the UP for a PDU session, and the selection may be deferred to the UPF selection phase or later.

In the embodiment illustrated in FIG. 8, for example, in step 800 the UE establishes NAS signaling transport, such as an IPSEC SA (but other security schemes, including but not limited to TLS, may be employed instead). After the UE has established the NAS signaling transport with the N3IWF, the UE uses NAS signaling to request a PDU Session (step 802), which triggers a PDU session establishment procedure (steps 804-818).

UP setup, N6-LAN side. In the embodiment illustrated in FIG. 8, the N3IWF does not provide UP information to the SMF during the first part of the PDU session establishment procedure (steps 804 and 806). The SMF decides to use a UPF that has N3IWF-UP capability and selects such a UPF (step 808). The SMF interacts with the selected UPF via N4 interface for user plane setup facing the N6-LAN side.

In preparation for having multiple control plane entities (i.e., the SMF and the N3IWF) control a single user plane entity (i.e., the UPF), the PDU session establishment procedure includes generating per QoS Flow Preliminary PDRs for the N6-LAN side (e.g., for traffic to and from the core network) and sending them to the UPF (step 810), or, alternatively, having the UPF generate the relevant per QoS Flow Preliminary PDRs for the N6-LAN side (step 812). In one embodiment, the SMF constructs the per QoS Flow Preliminary PDRs for the N6-LAN side based on a QoS profile (e.g., received from a Policy Control Function (PCR)) and N6-LAN side tunnel/route information.

In the embodiment illustrated in FIG. 8, the UPF signals a successful session setup to the SMF (step 814). In one embodiment, the SMF returns the UP information to the N3IWF via the AMF (steps 816 and 818), including per QoS Flow-to-PDR bindings (i.e., binding between a QoS Flow ID and a PDR ID), a QoS profile returned from the SMF, and access side tunnel information during the user plane setup with the UE.

In one embodiment, the N3IWF and the UPF with N3IWF-UP capability may begin possible preparations for UP setup, including possible negotiations to get security authorization for access (step 820). In one embodiment, the UE and the original N3IWF may engage in method-specific UPS procedures prior to setting up the N3IWF-UP (step 822).

UP setup, Access side. In the embodiment illustrated in FIG. 8, the N3IWF will then initiate UP setup facing the access side (steps 824-830), including an interaction with the selected UPF, e.g., N3IWF-UP, via the protected N4x interface for user plane setup facing access side (steps 824 and 830). How the N3IWF accesses the N3IWF-UP via the protected interface is out of the scope of the present disclosure. In one embodiment, the N3IWF constructs the per QoS Flow Preliminary PDRs for the AN side (e.g., for traffic to and from the access network) based on QoS Flow-to-PDR binding (e.g., a binding between a QoS Flow ID and a PDR ID), the QoS profile returned from the SMF, and AN side tunnel information during the UP setup with the UE, and includes them in the N4x_Session_Setup_Request (step 824). Alternatively, the N3IWF-UP may generate relevant per QoS Flow Preliminary PDRs for the Access Network (AN) side (step 828).

In one embodiment, the UE and N3IWF-UP may engage in method-specific UPS procedures for setting up the UP path (step 826).

In one embodiment, the N6-LAN side Preliminary PDRs provided by the SMF include downlink filters and uplink Forwarding Action Rules (FARs), while the AN side Preliminary PDRs provided by the N3IWF include uplink filters and downlink FARs.

In the embodiment illustrated in FIG. 8, the UPF signals a successful session setup to the N3IWF (step 830). The N3IWF signals successful PDU session setup to the AMF (step 832), and the AMF updates the SMF accordingly (step 834).

6 COMBINE UPF TO A SELECTED N3IWF-UP FUNCTION NODE

Figure 9:
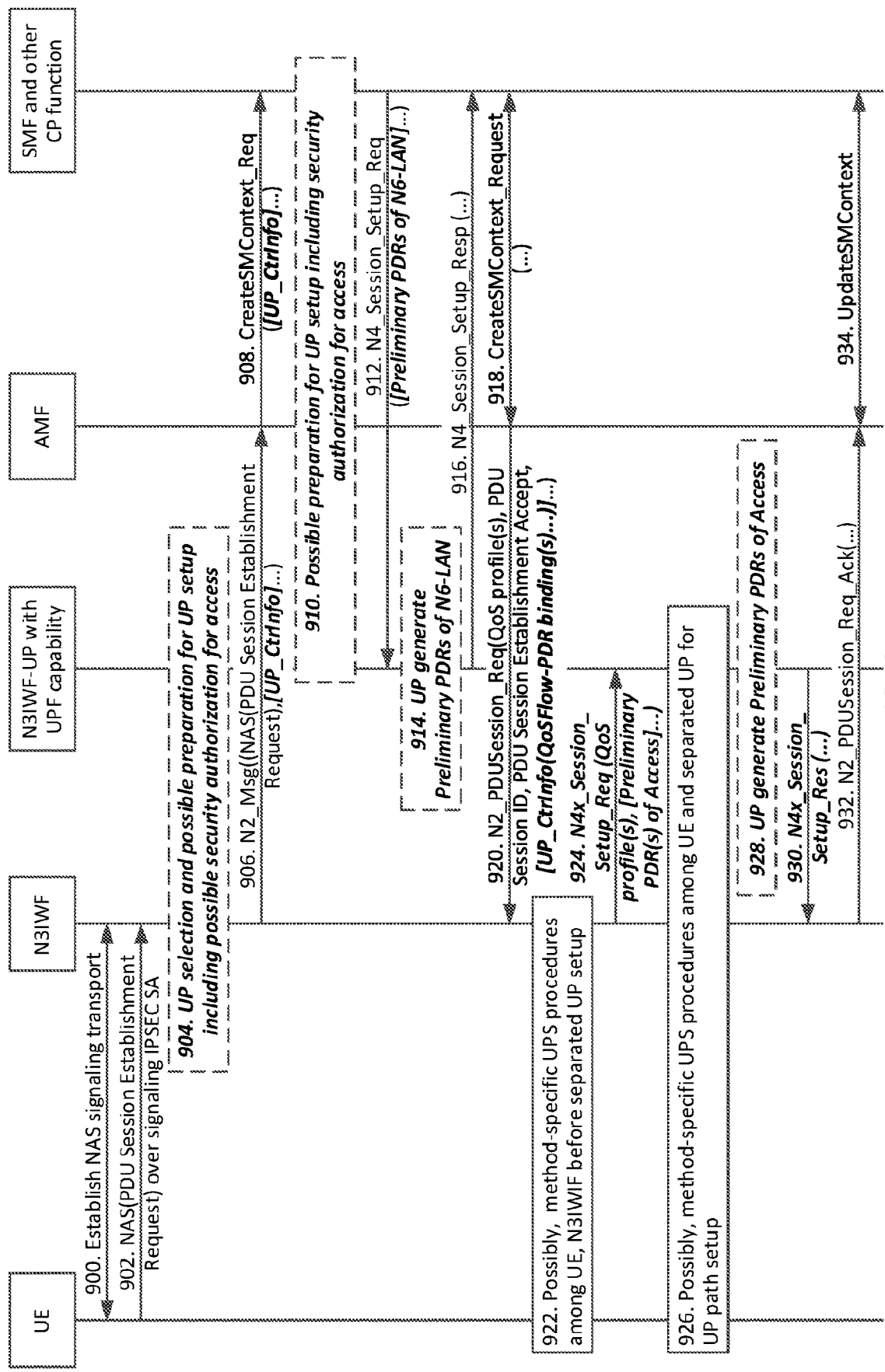
FIG. 9 illustrates a method for UPS and UPL for 5G non-3GPP access that includes combining a UPF with a selected N3IWF-UP according to an embodiment of the present disclosure.

FIG. 9 illustrates a method for UPS and UPL for 5G non-3GPP access that includes combining a UPF with a selected N3IWF-UP according to an embodiment of the present disclosure. FIG. 9 illustrates another scenario in which two control plane functions (SMF and N3IWF) control a single user plane function (N3IWF-UP) as defined in section 7 of the present disclosure.

In some cases, such as the case of trusted non-3GPP access and fixed access, the UP of the N3IWF to serve a PDU session may have already been associated with the access network (for example already deployed in the data center of broadband network) and the N3IWF is responsible to provide the UP (N3IWF-UP) information to the SMF during the PDU session procedure.

This is illustrated in FIG. 9, in which, after the UE has established a NAS signaling transport, such as IPSEC SA or other, with the N3IWF (step 900), the UE uses NAS signaling to request a PDU Session (step 902). In the embodiment illustrated in FIG. 9, the N3IWF selects a N3IWF-UP node having UPF capability and possibly prepares for UP setup, including possible negotiations with the N3IWF-UP node to get security authorization for access (step 904).

UP setup, N6-LAN side. The N3IWF notifies the SMF of the selection (steps 906 and 908) as part of the PDU Session Establishment process. In the embodiment illustrated in FIG.

9, the SMF decides to use the UPF function integrated in the selected N3IWF-UP node for the PDU session, rather than selecting an individual UPF node, and will therefore interact with the selected N3WIF-UP node via the protected N4 interface for user plane setup facing N6-LAN side. How the SMF accesses the N3IWF-UP via the protected interface is out of the present disclosure. In one embodiment, the SMF and the selected N3IWF-UP node having UPF capability may begin possible preparations for UP setup, including possible negotiations to get security authorization for access (step 910).

In the embodiment illustrated in FIG. 9, the SMF generates per QoS Preliminary PDRs for the N6-LAN side and sends them to the N3IWF-UP as part of a N4_Session_Setup_Request (step 912); alternatively, the N3IWF-UP may generate its own per QoS Preliminary PDRs for the N6-LAN side (step 914). In one embodiment, the SMF constructs the per QoS Flow Preliminary PDRs for the N6-LAN side based on a QoS profile (e.g., received from a Policy Control Function (PCR)) and N6-LAN side tunnel/route information. The N3IWF-UP signals successful session setup to the SMF (step 916).

In the embodiment illustrated in FIG. 9, the SMF continues the PDU session setup process (steps 918 and 920), during which the SMF provides QoS Flow-to-PDR bindings to the N3IWF (step 920).

UP setup, AN side. In one embodiment, the UE and the original N3IWF may engage in method-specific UPS procedures prior to setting up the N3IWF-UP (step 922). In the embodiment illustrated in FIG. 9, the N3IWF will interact with the selected N3IWF-UP via the protected N4x interface for user plane setup facing access side (steps 924-930). How the N3IWF access to N3IWF-UP via the protected interface is out of the present disclosure.

In one embodiment, the UE and N3IWF-UP may engage in method-specific UPS procedures for setting up the UP path (step 926). In one embodiment, the N3IWF-UP may generate relevant per QoS Flow Preliminary PDRs for the Access Network (AN) side (step 928). In one embodiment, the N3IWF-UP constructs the per QoS Flow Preliminary PDRs for the AN side based on QoS Flow-to-PDR binding, the QoS profile returned from the SMF, and AN side tunnel information during the UP setup with the UE.

In one embodiment, the N6-LAN side Preliminary PDRs provided by the SMF include downlink filters and uplink Forwarding Action Rules (FARs), while the AN side Preliminary PDRs provided by the N3IWF include uplink filters and downlink FARs.

In the embodiment illustrated in FIG. 9, the UPF signals a successful session setup to the N3IWF (step 930). The N3IWF signals successful PDU session setup to the AMF (step 932), and the AMF updates the SMF accordingly (step 934).

6.1 Combine UPF to a Selected N3IWF (CP+UP) Node

This is a special case of the method shown in FIG. 8 or 9, but where N3IWF is not separated into separate CP and UP entities. In the untrusted non-3GPP access when N3IWS doesn't support UPS, the solution could be considered to support one UPF model. The same principles stated above are applied to this special case except that where the N3IWF-UP is a portion of a N3IWF that also includes the CP functions, an N4x interface may not be required.

A method to control data forwarding of non-standalone UP from multiple CPs (SMF and N3IWF itself) is defined in section 7 of the present disclosure

7 METHOD TO CONTROL DATA FORWARDING FOR A STANDALONE UP FROM MULTIPLE CPS

Figure 10:
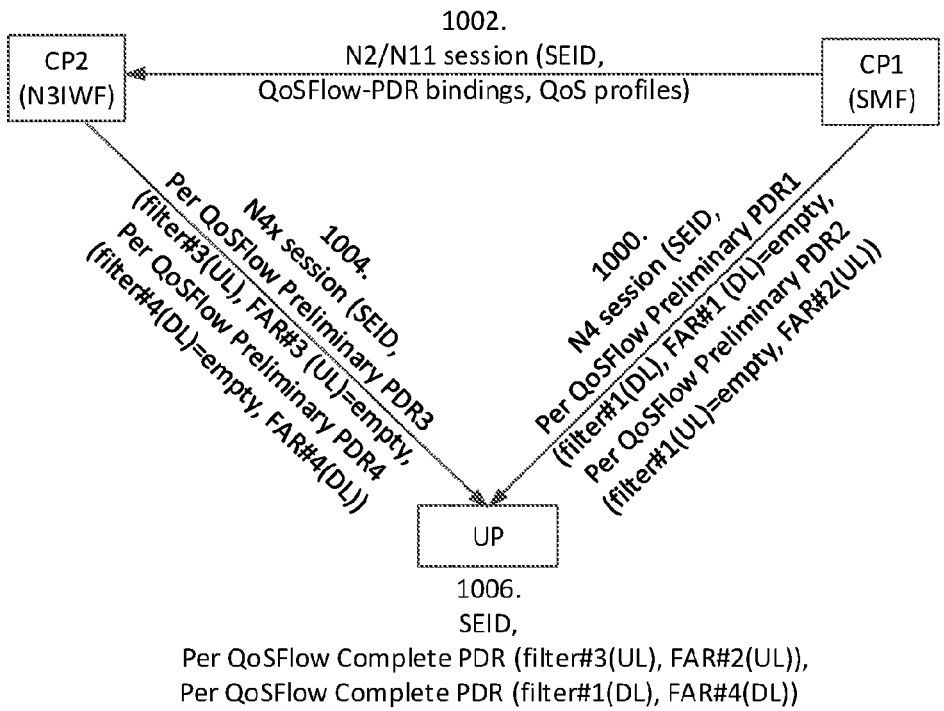
FIG. 10 illustrates a method for UPS and UPL for 5G non-3GPP access that includes control data forwarding from multiple CPs to a standalone UP according to an embodiment of the present disclosure.

FIG. 10 illustrates a method for UPS and UPL for 5G non-3GPP access that includes control data forwarding from multiple CPs to a standalone UP (e.g., a N3IWF that doesn't support UPS) according to an embodiment of the present disclosure. In the embodiment illustrated in FIG. 10, two CPs control one UP entity, but the same principles may be applied or extended to allow more than two CPs to control one UP.

When one UP is controlled for data forwarding by two CPs, either CP only provides per QoS Flow Preliminary PDRs. A per QoS Flow Preliminary PDR as defined in section 14.2 of the present disclosure either contains per QoS Flow filters (Packet Detection Information (PDI) and Outer Header Removal) but without corresponding per QoS Flow FAR, or contains per QoS Flow FAR but without corresponding per QoS Flow filters.

A per QoS Flow Complete PDR is formed when one per QoS Flow Preliminary PDR provided by one CP is correlated with another per QoS Flow Preliminary PDR provided by another CP. In one embodiment, to support the correction, the CPs will synchronize the control information between them. In one embodiment, the CP that first controls the UP will provide control binding information to the CP that will later control the same UP. The control binding information may be same session id used on UPS interfaces, binding between PDR and QoS Flow and the QoS profile itself (see the definition in section 16 of the present disclosure). In one embodiment, the correlation is done in a N3IWF based on QoS Flow-to-PDR binding (binding between QoS Flow ID and PDR ID).

In the embodiment illustrated in FIG. 10, a first control plane entity CP1 (e.g., an SMF) and a second control plane entity CP2 (e.g., an N3IWF) both control a user plane entity UP. At step 1000, the CP1 sends a pair of preliminary PDRs, PDR1 and PDR2, to the UP. At step 1002, the CP1 sends control binding information to CP2. In an alternative embodiment, step 1002 may be performed before or at the same time as step 1000. At step 1004, CP2 sends a pair of preliminary PDRs, PDR3 and PDR4, to the UP. At step 1006, the correlation of preliminary PRDs PDR1-4 is performed.

In an alternative embodiment, depending on UP capability or solution design, the Preliminary PDR may not be created by a CP: instead, the UP may generate it by itself. Same principle is applied for Complete PDR correlation. In this case, a CP may not provide a Preliminary PDR but may instead send a message to the UP to trigger Preliminary PDR generation and/or correlation by the UP.

7.1 Method to Control Data Forwarding of Non-Standalone UP from Multiple CPs

Figure 11:
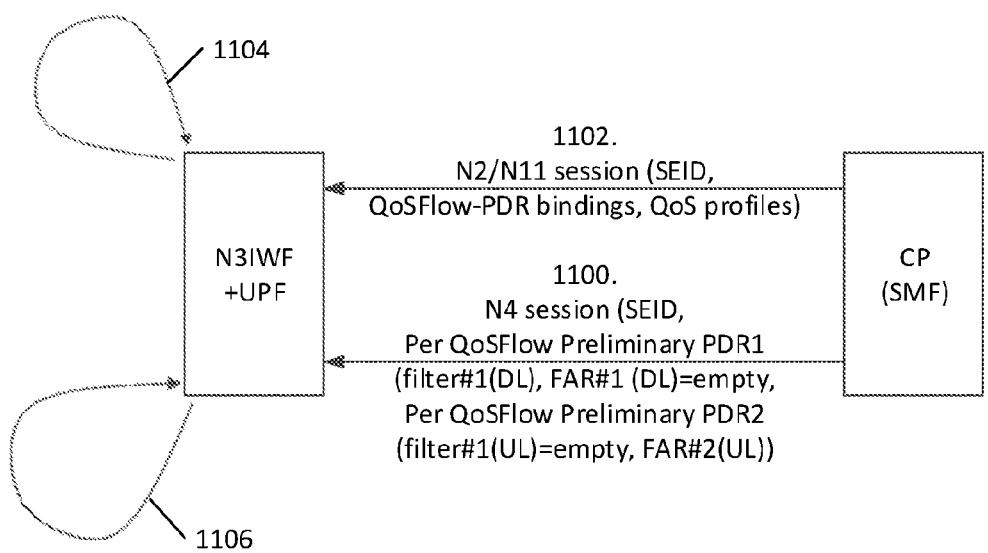
FIG. 11 illustrates a method for UPS and UPL for 5G non-3GPP access that includes control data forwarding from multiple CPs to a non-standalone UP according to an embodiment of the present disclosure.

FIG. 11 illustrates a method for UPS and UPL for 5G non-3GPP access that includes control data forwarding from multiple CPs to a non-standalone UP according to an embodiment of the present disclosure. In the embodiment illustrated in FIG. 11, the N3IWF is not separated into CP and UP entities. In one embodiment, the N3IWF includes UPF capability, e.g., the UPF is combined with the N3IWF. The principles described above with regard to FIG. 10 apply to the special case except that there is only one leg explicitly (between SMF and UP) and other leg is degraded into internal implementation within the N3IWF. In the embodiment illustrated in FIG. 11, only the SMF needs to provide Preliminary PDRs to the UP (N3IWF) explicitly for one leg via the standalone N4 interface (step 1100). The SMF will provide control binding information to N3IWF (step 1102). The N3IWF then provides itself with Preliminary PDRs for other leg (step 1104) and then correlates Preliminary PDRs for both legs to form Complete PDRs (step 1106). Steps 1104 and 1106 are performed internally within the N3IWF.

8 UE REQUIREMENT

The UE will support either or all of the three UPS solutions (i.e., the IKE clone and relocation solution, the IPSEC endpoint separation solution, and the TLS-based UPS solution) and the IKE redirection solution. In the three UPS solutions, the UE negotiates with N3IWF about UPS capability. In the IKE clone and relocation solution, the UE will support IKE clone, and IKE relocation. In addition, the UE will support IPSEC tunnel for UP setup on the relocated IKE session. In the IPSEC endpoint separation solution, the UE will support IPSEC SA relocation and transfer IPSEC tunnel in the relocated endpoint. In the TLS-based UPS solution, the UE will support TLS SA relocation and setup data TLS in the relocated endpoint with the pre-shared key of EMSK generated via 5G registration authentication in the signaling procedure. In the IKE redirection solution, the UE will support IKE redirection via IKE_INFORMATIONAL exchange.

9 N3IWF REQUIREMENT

The N3IWF (the N3IWF-CP) will support UPS and UPL requirements.

10 N3IWF REQUIREMENT FOR UPS SUPPORT

The N3IWF will support all of the three UPS solutions (i.e., the IKE clone and relocation solution, the IPSEC endpoint separation solution, and the TLS-based UPS solution) and the IKE redirection solution. In the four solutions, the N3IWF will retrieve N3IWF-UP or redirected N3IWF IP address either from procedures of PDU session toward 5G core, or from other approaches such as locally configuration. In the IKE clone and relocation solution, the N3IWF will support IKE clone, and IKE relocation. In addition, the N3IWF will support IPSEC tunnel for UP setup on the relocated IKE session. In the IPSEC endpoint separation solution, the N3IWF will support IPSEC SA relocation and transfer IPSEC tunnel in the relocated endpoint In the TLS-based UPS solution, the N3IWF will support TLS SA relocation and setup data TLS in the relocated endpoint with the pre-shared key of EMSK generated via 5G registration authentication in the signaling procedure In the IKE redirection solution, the N3IWF will support IKE redirection via IKE_INFORMATIONAL exchange.

11 N3IWF REQUIREMENT FOR UPL SUPPORT

The N3IWF will support both setup of N3IWF-UP into a selected UPF to form ONE UP or combining a UPF to a selected N3IWF-UP to form ONE UP. The N3IWF will set up Preliminary PDR of AN to the ONE UP via N4x. For Preliminary PDR of AN, the N3IWF constructs Preliminary PDRs of Access based on QoS Flow-to-PDR binding, QoS profile returned from SMF, and Access side tunnel information during the UP setup with UE.

To support setup of N3IWF-UP into a selected UPF, the N3IWF will provide a control interface address (and/or necessary security access information) of the N3IWF-UP to the SMF. To support combining a UPF to a selected N3IWF-UP, the N3IWF will retrieve a control interface address of the UP as QoS Flow-to-PDR binding from SMF.

12 SMF REQUIREMENT

The SMF will support both setup of an N3IWF-UP into a selected UPF to form ONE UP or combining a UPF to a selected N3IWF-UP to form ONE UP. The SMF will set up Preliminary PDR of N6-LAN to the ONE UP via N4. For Preliminary PDR of N6-LAN, the SMF constructs Preliminary PDRs of N6-LAN based on a QoS profile (e.g., returned from a Policy and Control Function (PCF)) and N6-LAN tunnel/route information.

To support setup of a N3IWF-UP into a selected UPF, the SMF will retrieve a control interface address (and/or necessary security access information) as N4 interface to control ONE UP. To support combining a UPF to a selected N3IWF-UP, the SMF will provide a control interface address of UP as QoS Flow-to-PDR binding to N3IWF.

13 ONE UP (COMBINED N3IWF-UP AND UPF) REQUIREMENT

The ONE UP will support both setup of N3IWF-UP into a selected UPF to form ONE UP or combining a UPF to a selected N3IWF-UP to form ONE UP. The ONE UP will support setup of Preliminary PDR of AN (first or next) and setup of Preliminary PDR of N6-LAN (next or first). Whenever the ONE UP is configured a Preliminary PDR of AN (or of N6-LAN), it will search the configured (if any) Preliminary PDR of N6-LAN (or of Access) to form a Complete PDR and remove the corresponding Preliminary PDRs. The ONE UP will support all three UPS solutions (i.e., the IKE clone and relocation solution, the IPSEC endpoint separation solution, and the TLS-based UPS solution) and the IKE redirection solution.

In the IKE clone and relocation solution, the ONE UP will support IKE and IPSEC tunnel setup for UP. In the IPSEC endpoint separation solution, the ONE UP will support IPSEC SA relocation from CP and IPSEC tunnel setup for UP In the TLS-based UPS solution, the ONE UP will support TLS SA relocation from CP and setup data TLS with the pre-shared key of EMSK configured from CP In the IKE redirection solution, the ONE UP will support IKE and IPSEC tunnel setup for UP.

14 DEFINITION FOR UPL TO SUPPORT PER QOS FLOW UP DATA FORWARDING 14.1 Complete PDR The Complete PDR can refer to the definition in section 7.5.2.2 of [4] with following specified or noted for N3IWF & UPF combined UP node:

| IE Definition | Remark for uplink |
| --- | --- |
| Source Interface in PDI | Value: 0 (Access) for uplink<br>Value: 2 (N6-LAN) for downlink |
| L2 Filter in PDI | This is required to defined by 3GPP to support Ethertype PDU |
| Outer Header Removal | It should extend to support header types corresponding to protocol models for the present disclosure:<br>(1) IPSEC-based non-3GPP<br>(2) TLS-based non-3GPP<br>(3) L2-based non-3GPP |

14.1.1 L2 Filter Definition in PDI (Informal)

| Octets | Bits 8 | 7 | 6 | 5 | 4 | 3 | 2 | 1 |
|---|---|---|---|---|---|---|---|---|
| 1 to 2 | Type = TBD (decimal) ||||||||
| 3 to 4 | Length = n ||||||||
| 5 | Spare | Spare | Spare | SVID | CVID | DM | SM | E |
| 6 | Spare ||||||||
| 7 | Ethertype ||||||||
| 8 to 13 | Source MAC address ||||||||
| 14 to 19 | Destination MAC address ||||||||
| 20 | Customer VLAN ID ||||||||
| 21 | Service VLAN ID ||||||||
| 22 to (n + 4) | These octet(s) is/are present only if explicitly specified ||||||||

14.1.2 Extension Definition for Outer Header Removal

The Outer Header Removal Description field in Outer Header Removal as defined in [4] section 8.2.64 is extended and specified as following:

| Outer Header to be removed from the incoming packet | Value (Decimal) | Remark |
|---|---|---|
| GTP-U/UDP/Ipv4 | 0 | Not used in the present disclosure |
| GTP-U/UDP/Ipv6 | 1 | Not used in the present disclosure |
| UDP/Ipv4 | 2 | Used for TLS-based non-3GPP to remove UDP/Ipv4 headers |
| UDP/Ipv6 | 3 | Used for TLS-based non-3GPP to remove UDP/Ipv6 headers |
| ESP/UDP/Ipv4 | 5 | Newly defined in the present disclosure for IPSEC-based non-3GPP to remove ESP/UDP/Ipv4 headers |
| ESP/UDP/Ipv6 | 6 | Newly defined in the present disclosure for IPSEC-based non-3GPP to remove ESP/UDP/Ipv6 headers |
| Eth | 7 | Newly defined in the present disclosure for L2-based non-3GPP to remove Ether Header |
| For future use. Shall not be sent. | 8 to 255 | |

14.1.3 FAR

The FAR in PDR keeps the same definition in section 7.5.2.3 of [4] with following noted:

| IE Definition | Remark for uplink |
|---|---|
| Destination Interface in FAR | Value: 0 (Access) for downling<br>Value: 2 (N6-LAN) for uplink |
| Outer Header Creation in FAR | It should extend to support header types corresponding to protocol models for the present disclosure:<br>(1) IPSEC-based non-3GPP<br>(2) TLS-based non-3GPP<br>(3) L2-based non-3GPP |

14.1.4 Extension Definition for Outer Header Creation

The Outer Header Creation defined in [4] section 8.2.56 is extended and specified as following:

| Octets | Bits 8 | 7 | 6 | 5 | 4 | 3 | 2 | 1 |
|---|---|---|---|---|---|---|---|---|
| 1 to 2 | Type = 84 (decimal) ||||||||
| 3 to 4 | Length = n ||||||||
| 5 to 6 | Outer Header Creation Description ||||||||
| m to (m + 3) | TEID ||||||||
| p to (p + 3) | Ipv4 Address ||||||||
| q to (q + 15) | Ipv6 Address ||||||||
| r to (r + 1) | Port Number ||||||||
| s to (s + 5) | ESP ||||||||
| t to (t + 5) | Source MAC address ||||||||
| u to (u + 1) | Destination MAC address ||||||||
| v to (v + 1) | Customer VLAN ID ||||||||
| w to (w + 1) | Service VLAN ID ||||||||
| x to (x + 1) | EtherType ||||||||
| w to (n + 4) | These octet(s) is/are present only if explicitly specified ||||||||

The Outer Header Creation Description field in Outer Header Creation is extended and specified as following

| Octet/Bit | Outer Header to be created in the outgoing packet | Remark |
|---|---|---|
| 5/1 | GTP-U/UDP/Ipv4 | Not used in the present disclosure |
| 5/2 | GTP-U/UDP/Ipv6 | Not used in the present disclosure |
| 5/3 | UDP/Ipv4 | Used for TLS-based non-3GPP to add UDP/Ipv4 headers |
| 5/4 | UDP/Ipv6 | Used for TLS-based non-3GPP to add UDP/Ipv6 headers |
| 5/5 | ESP/UDP/Ipv4 | Newly defined in the present disclosure for IPSEC-based non-3GPP to add ESP/UDP/Ipv4 headers |
| 5/6 | ESP/UDP/Ipv6 | Newly defined in the present disclosure for IPSEC-based non-3GPP to add ESP/UDP/Ipv6 headers |
| 5/7 | MAC/Ethertype | Newly defined in the present disclosure for L2-based non-3GPP to add Ether Header |
| 5/8 | MAC/Ethertype/C-VLAN | Newly defined in the present disclosure for L2-based non-3GPP to add Ether Header and C-VLAN |
| 6/1 | MAC/Ethertype/CS-VLAN | Newly defined in the present disclosure for L2-based non-3GPP to add Ether Header, C-VLAN and S-VLAN |

14.2 Preliminary PDR

Compared to a Complete PDR, a Preliminary PDR is an incomplete PDR which either contains per QoS Flow filters (PDI and Outer Header Removal) but without corresponding per QoS Flow FAR, or contains per QoS Flow FAR but without corresponding per QoS Flow PDI. A Preliminary PDR exists on one leg of UP node: in the Access side, it is referred to as a Preliminary PDR of AN; in the N6-LAN side, it is referred to as a Preliminary PDR of N6-LAN.

14.2.1 Preliminary PDR of Access Network (AN)

In one embodiment, a Preliminary PDR of AN contains per QoS Flow filters for uplink direction but has no corresponding per QoS Flow FAR. At the same time, it contains per QoS Flow FAR for downlink direction but has no corresponding per QoS Flow filters. In one embodiment, a N3IWF may construct Preliminary PDRs of Access based on QoS Flow-to-PDR binding, QoS profile returned from SMF and Access side tunnel information during the UP setup with UE.

14.2.2 Preliminary PDR of N6-LAN

In one embodiment, a Preliminary PDR of N6-LAN contains per QoS Flow filters for downlink direction but has no corresponding per QoS Flow FAR. At the same time, it has per QoS Flow FAR for uplink direction but has no corresponding per QoS Flow filters. A SMF may construct Preliminary PDRs of N6-LAN based on QoS profile (e.g., returned from PCF) and N6-LAN tunnel/route information.

15 DEFINITION FOR UPS

15.1 IKE UPS_SUPPORT

In one embodiment, the UPS_SUPPORT uses the Notify Payload packet format as described in section 3.10 of IKE [6]. In one embodiment, the Notify Payload is used in IKE_AUTH exchange. The Notify Message Type is assigned by IANA (TBD).

15.2 TLS UPS_SUPPORT

The hello extension is defined in TLS [12]. The following extension is added into hello extension to negotiate ups capability:

```
enum {
    ups_unsupport(0) ,
    ups_support(1),
} UpsCapability;
struct {
    UpsCapability ups;
} UpsCapabilityExtension;
```

15.3 Key Definition for Data TLS

The master_secret for data TLS can follow the definition in TLS [12].

```
Master_secret = PRF(
    pre_master_secret, "master secret",
    ClientHello.random +
    ServerHello.random) [0..47];
```

EMSK is used as pre-shared key: pre_master_secret here. The EMSK for Extensible Authentication Protocol Authentication and Key Agreement (EAP-AKA) is defined in [13]. The derivation function can follow 3GPP definition. The TS33.402 ANNEX A.3 for WLAN Control Protocol (WLCP) key definition can be a good reference.

16 UP CONTROL INFORMATION FOR N3IWF AND SMF (INFORMAL)

The UP_Ctrinfo provides UP control information for UPS, UPL and N3IWF redirection purposes. The N3IWF exchanges UP_Ctrinfo with SMF via AMF. Either the N3IWF or SMF can initially generate UP_Ctrinfo. The definition of UP_Ctrinfo is treated as implementation dependent. This section only provides a conceptual guide. N3IWF provides following UP_Ctrinfo to SMF in order to provide it with a selected UP.

| Information Item | Remark |
| --- | --- |
| UP control interface | Control address of UP that SMF can use to communicate with the UP |
| UP endpoint information | The UP IP address facing towards the N6-LAN |
| [Security access information] | The information for SMF to access to the UP, such as certificate for TLS-based access |

In one embodiment, a SMF may provide the following UP_Ctrinfo to a N3IWF:

| Information Item | Remark |
| --- | --- |
| UP control interface | Control address of the UP that N3IWF can use to communicate with the UP |
| UP endpoint information | The UP IP address facing towards the Access side; in IKE redirection case, it is the IP address of redirected N3IWF |
| List of QoS Flow-to-PDR bindings | The SMF provides QoS Flow-to-PDR binding the N3IWF then N3IWF can know which PDR ID can be corresponding to which the QoS Flow ID (or QFI) for UP setup via N4x |
| SEID | The SMF provides the N3IWF the SEID to identify the same N4 session |
| [Security access information] | The information for SMF to access to the UP, such as certificate for TLS-based access |

17 N4X INTERFACE (INFORMAL)

This interface definition between N3IWF (CP) and N3IWF-UP could be implementation dependent. This section only provides conceptual guide. In one embodiment, for interface for IKE clone and relocation solution, the following information may be provided to N3IWF-UP:

| Information Item | Remark |
| --- | --- |
| IKE SA cloned | the IKE SA parameters required by IKE [6] |
| key | Share key of the cloned IKE SA |
| SPIs | SPIs of the cloned IKE SA |
| Other information | Other non-IKE information such as QoS profile used for setup UP bearer |

Interface for IPSEC Endpoint Separation Solution:

| Information Item | Remark |
| --- | --- |
| IPSEC SA created | the IPSEC SA parameters required by IKE [66] |
| key | Share key of the created IPSEC SA |
| SPIs | SPIs of the cloned IPSEC SA |
| Other information | Other non-IKE information such as QoS profile used for setup UP bearer |

Interface for TLS-Based UPS Solution

| Information Item | Remark |
| --- | --- |
| CipherSpec | the CipherSpec parameters required by TLS [12] |
| key | The pre-master-secret using MSK (see section 15.3) |
| Other information | Other non-IKE information such as QoS profile used for setup UP bearer |

18 N4 INTERFACE IMPACTED (INFORMAL)

The main impact on N4 interface is to provision Preliminary PDR as defined in sections 5, 6, 7, and 14 of the present disclosure. For section 7, to support combining a UPF to a selected N3IWF-UP node, there may be security authorization before access to UP node through N4 interface, which could be implementation dependent.

19 EXAMPLE EMBODIMENTS

Figure 12:
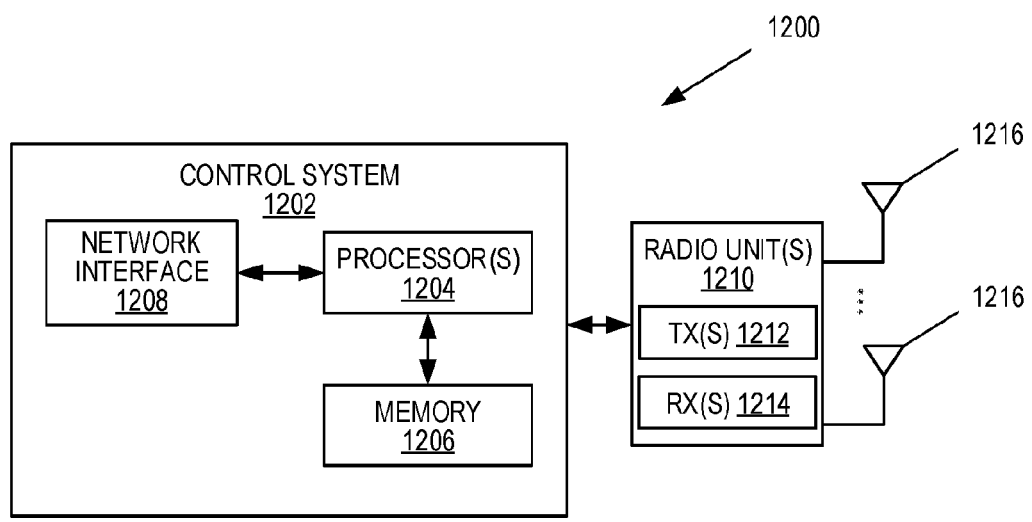
FIG. 12 is a schematic block diagram of a radio access node according to some embodiments of the present disclosure.

FIG. 12 is a schematic block diagram of a radio access node 1200 according to some embodiments of the present disclosure. The radio access node 1200 may be, for example, a base station 202 or 206. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. In addition, the radio access node 1200 includes one or more radio units 1210 that each includes one or more transmitters 1212 and one or more receivers 1214 coupled to one or more antennas 1216. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
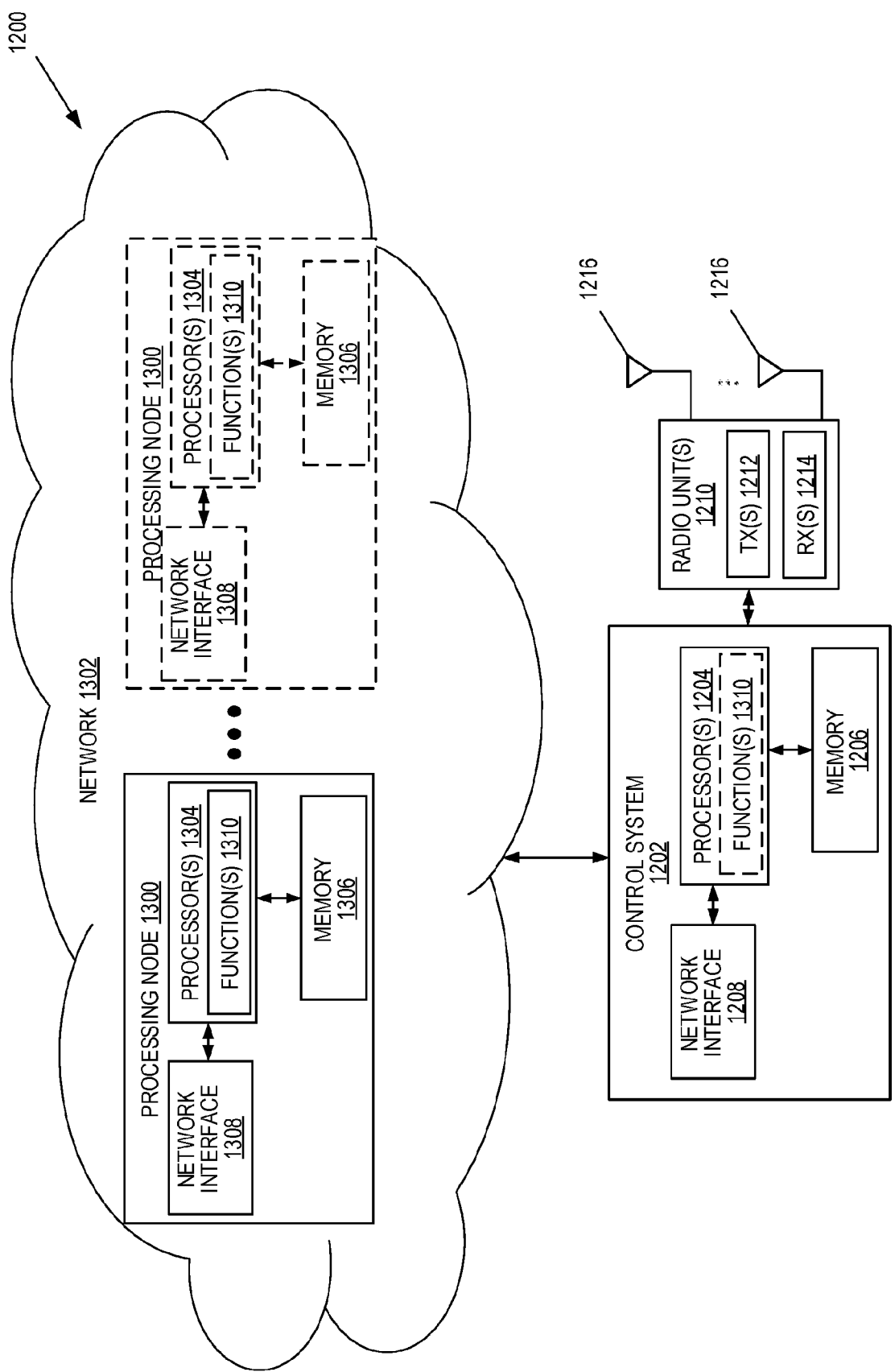
FIG. 13 is a schematic block diagram that illustrates a virtualized embodiment of the radio access node of FIG. 12 according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
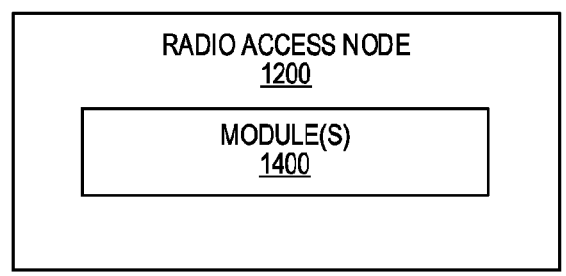
FIG. 14 is a schematic block diagram of the radio access node of FIG. 12 according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
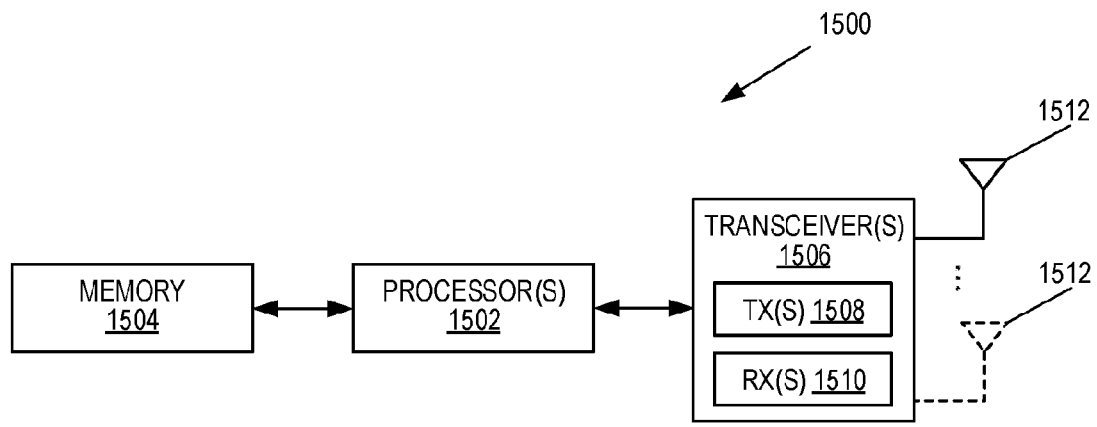
FIG. 15 is a schematic block diagram of a User Equipment device (UE) according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. In some embodiments, the functionality of the UE 1500 described above may be fully or partially implemented in software that is, e.g., stored in the memory 1504 and executed by the processor(s) 1502.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
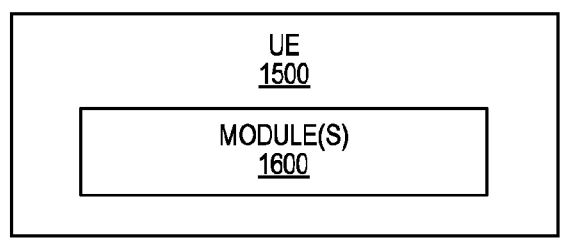
FIG. 16 is a schematic block diagram of the UE of FIG. 15 according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
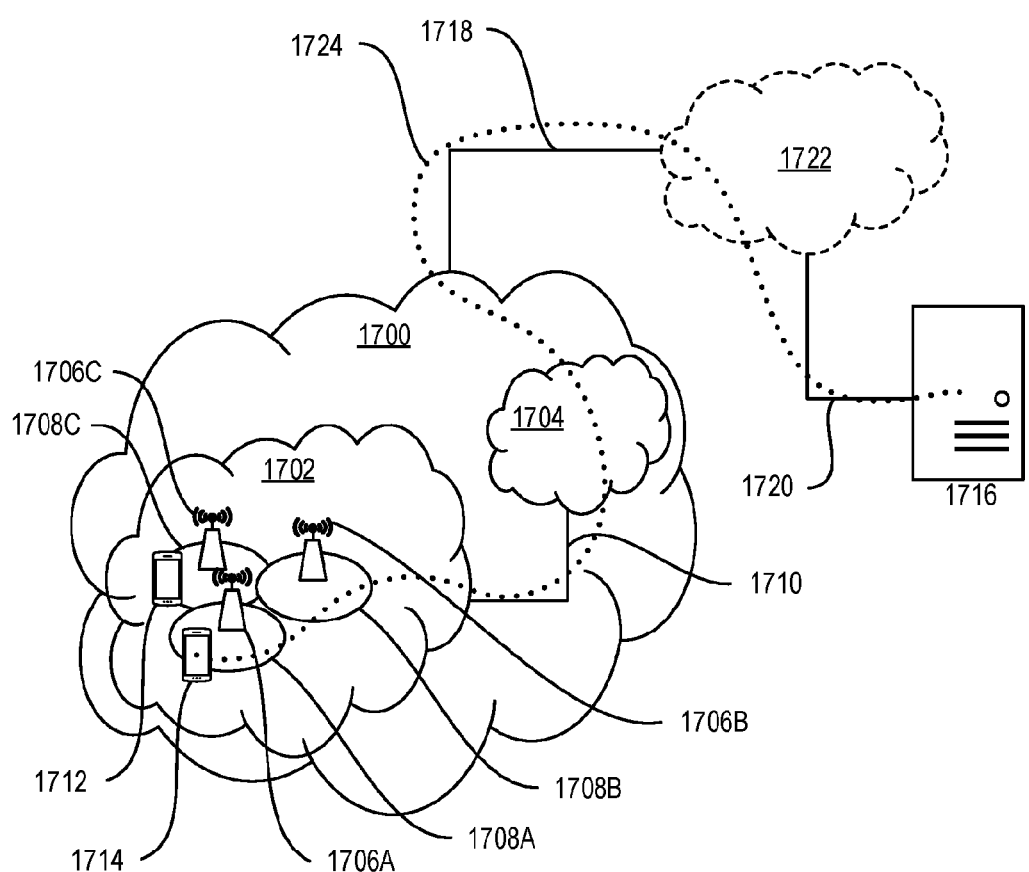
FIG. 17 illustrates a telecommunication network connected via an intermediate network to a host computer in accordance with some embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
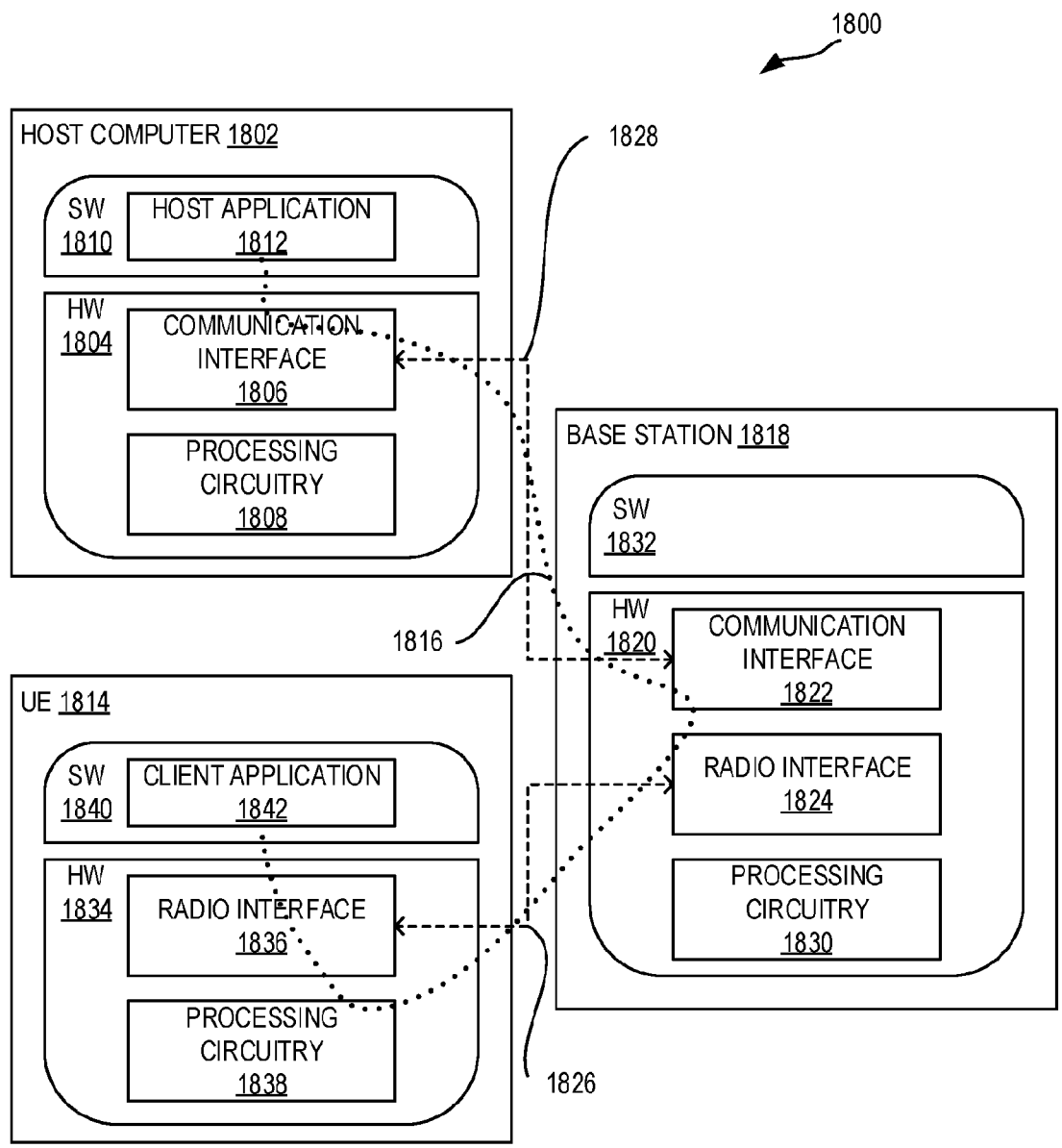
FIG. 18 is a generalized block diagram of a host computer communicating via a base station with a UE over a partially wireless connection in accordance with some embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the overall performance of network by providing UPS and UPL solution methods for 5G non-3GPP access (including for standalone N3IWF nodes without CP and UP separated), allowing two or more control plane entities to control a single user plane entity, and providing integration of UP functions in or near to the access network, including supporting local breakout use cases (such as MEC), and thereby provide benefits such as optimizing the traffic route used by non-3GPP protocols to and from the core network.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1814, and it may be unknown or imperceptible to the base station 1814. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'preliminary' messages, using the OTT connection 1816 while it monitors propagation times, errors, etc.

Figures 19, 20:
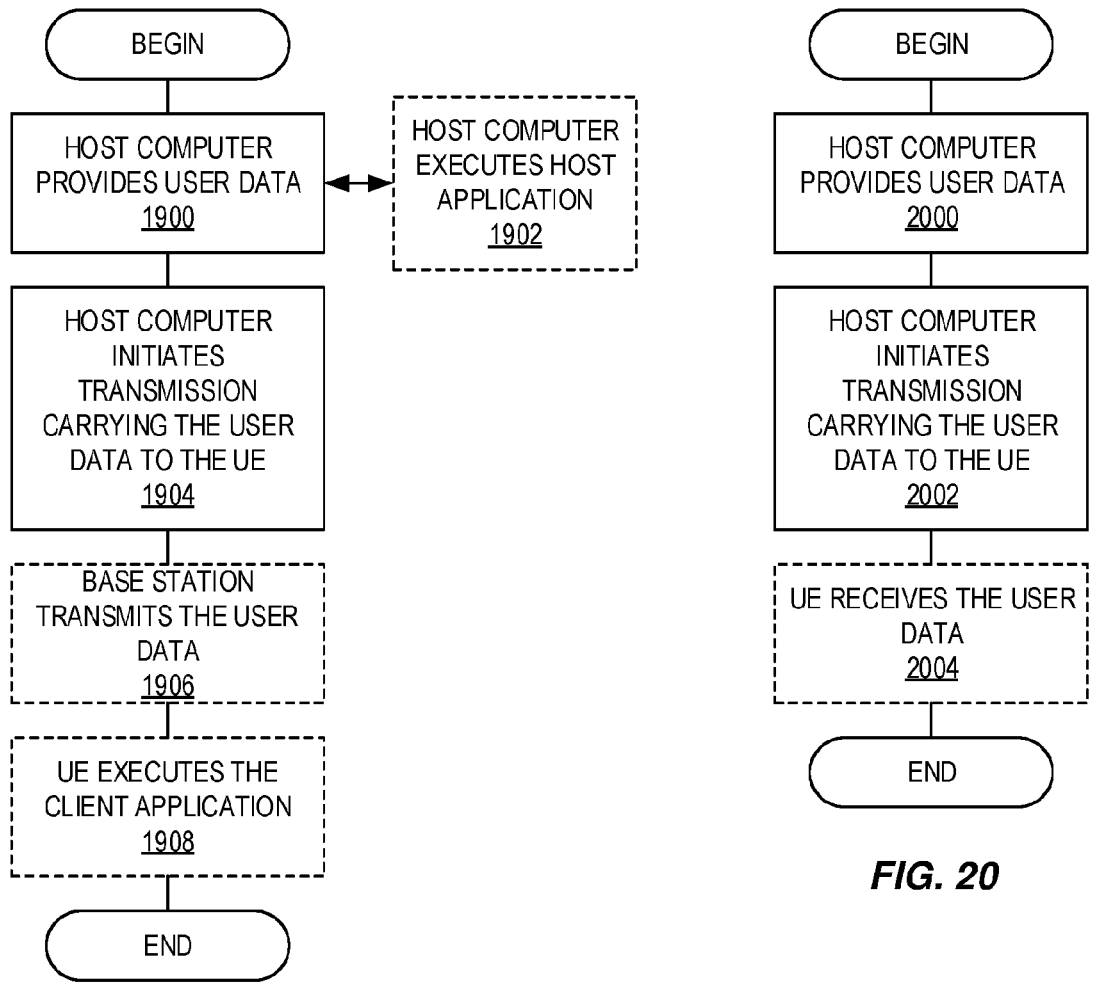
FIG. 19 is a flowchart illustrating a method implemented in a communication system in accordance with one embodiment of the present disclosure.
FIG. 20 is a flowchart illustrating a method implemented in a communication system in accordance with one embodiment of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the invention, it should be understood that such order is exemplary (e.g., alternative embodiments may perform the operations in a different order, combine certain operations, overlap certain operations, etc.).

The present disclosure provides solution methods to support User Plane Local Offloading (UPL) for non-3GPP access in the 5G network and support User Plane Separation (UPS) for N3IWF. The present disclosure has following advantages:

a) It provides three UP separation solution methods for 5G non-3GPP access: IKE clone and relocation method; IPSEC endpoint separation method; and TLS-based UPS method.

b) It provides UPL solution methods for 5G non-3GPP access with two scenarios/options for combined N3IWF UP and 5G UPF.

c) It provides a design for two or more CPs to control one single UP in a 5G non-3GPP network and provides a preliminary PDR correlation design method.

d) It provides a method for integration of one single UP design into an AN to optimized traffic route and possibly eliminate an extra hop.

e) It provides one IKE-based N3IWF redirection solution method for UPL breakout for 5G non-3GPP access.

f) It provides UPS and UPL methods to support untrusted 5G non-3GPP access, trusted 5G non-3GPP access, and fixed/wireline-based 5G non-3GPP access.

g) It addresses local breakout use cases (such as MEC) under 5G non-3GPP access network environment.

Example Embodiments

While not being limited thereto, some example embodiments of the present disclosure are provided below.

Embodiment 1

A method for User Plane Separation, UPS, and User Plane Local Offloading, UPL, for Fifth Generation, 5G, non-Third Generation Partnership Project, 3GPP, access and implemented in a User Equipment, UE, the method comprising:

establishing (700) an Internet Key Exchange, IKE, Security Association, SA, with a Non-3GPP Interworking Function, N3IWF, and indicating to the N3IWF that IKE SA redirection is supported;

receiving (718) from the N3IWF a request to redirect the IKE SA to a N3IWF-UP; and redirecting (722) the IKE SA to be associated with the N3IWF-UP instead of the N3IWF.

Embodiment 2

A method for User Plane Separation, UPS, and User Plane Local Offloading, UPL, for Fifth Generation, 5G, non-Third Generation Partnership Project, 3GPP, access and implemented in a Non-3GPP Interworking Function entity, N3IWF, the method comprising:

establishing (700) an Internet Key Exchange, IKE, Security Association, SA, with a UE;

identifying (716) a N3IWF-UP; and sending (718) to the UE a request to redirect the IKE SA to the identified N3IWF-UP.

Embodiment 3

A method for User Plane Separation, UPS, and User Plane Local Offloading, UPL, for Fifth Generation, 5G, non-Third Generation Partnership Project, 3GPP, access and implemented in a Session Management Function, SMF, the method comprising:

receiving (806) a request to create a Session Management, SM, context;

selecting (808) a User Plane Function, UPF, having a Non-3GPP Interworking Function entity, N3IWF, —User Plane, UP, capability; and sending (810) to the selected UPF a session setup request, the request comprising a preliminary Packet Detection Rule, PDR, for core network traffic.

Embodiment 4

A method for User Plane Separation, UPS, and User Plane Local Offloading, UPL, for Fifth Generation, 5G, non-Third Generation Partnership Project, 3GPP, access and implemented in a Non-3GPP Interworking Function entity, N3IWF, the method comprising:

receiving (818) a Protocol Data Unit, PDU, session request, the request comprising Quality of Service, QoS, Flow-Packet Detection Rule, PDR, binding information;

sending (824) to a N3IWF-UP a session setup request; and receiving (830) from the N3IWF-UP a session setup response.

Embodiment 5

The method of embodiment 4 wherein the session setup request comprises a preliminary PDR for access network traffic, the preliminary PDR having been generated by the N3IWF.

Embodiment 6

A method for User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, the method comprising:

correlating a preliminary Packet Detection Rule, PDR, for core network traffic with a preliminary PDF for access network traffic to create a full PDF.

Embodiment 7

The method of embodiment 6 wherein the preliminary PDR for core network traffic was received (810) from a Session Management Function, SMF, in a session setup request or was generated (812) by the N3IWF-UP.

Embodiment 8

The method of embodiment 6 wherein the preliminary PDR for access network traffic was received (824) from a N3IWF in a session setup user request or was generated (828) by the N3IWF-UP.

Embodiment 9

A method for User Plane Separation, UPS, and User Plane Local Offloading, UPL, for Fifth Generation, 5G, non-Third Generation Partnership Project, 3GPP, access and implemented in a Non-3GPP Interworking Function entity, N3IWF, the method comprising:
  receiving (902) from a User Equipment, UE, a Protocol Data Unit, PDU, session establishment request;
  selecting (904) a N3IWF-UP with User Plane Function, UPF, capability;
  sending (906) UP information to a Session Management Function, SMF;
  receiving (920) from the SMF a Quality of Service, QoS, Profile and a QoS Flow-Packet Detection Rule, PDR, binding; and
  sending (924) to the selected N3IWF-UP a session setup request.

Embodiment 10

The method of embodiment 9 wherein the session setup request comprises a preliminary PDR for access network traffic.

Embodiment 11

A method for User Plane Separation, UPS, and User Plane Local Offloading, UPL, for Fifth Generation, 5G, non-Third Generation Partnership Project, 3GPP, access and implemented in an Access and Mobility Management Function, AMF, the method comprising:
  receiving (906) from a Non-3GPP Interworking Function, N3IWF, a Protocol Data Unit, PDU, session establishment request, the request containing information identifying a N3IWF-UP with User Plane Function, UPF, capability; and
  sending (908) to a Session Management Function, SMF, a create Session Management, SM, context request, the request containing the information identifying a N3IWF-UP with UPF capability.

Embodiment 12

A method for User Plane Separation, UPS, and User Plane Local Offloading, UPL, for Fifth Generation, 5G, non-Third Generation Partnership Project, 3GPP, access and implemented in a Session Management Function, SMF, the method comprising:
  receiving (908) from an Access and Mobility Management Function, AMF, a request to create an SM context, the request identifying a Non-EGPP Interworking Function entity, N3IWF-UP, with User Plane Function, UPF, capability;
  negotiating (910) security authorization for access with the identified N3IWF-UP node with UPF capability; and
  sending (912) to the identified N3IWF-UP node with UPF capability a request to setup a session, the request including a preliminary PDF for core network traffic.

Embodiment 13

A method for User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, the method comprising:
  receiving (912) from a Session Management Function, SMF, a first session setup request comprising a preliminary Packet Detection Rule, PDR, for core network traffic;
  receiving (924) from a N3IWF a second session setup request comprising a preliminary PDR for access network traffic; and
  correlating the preliminary PDR for core network traffic with the preliminary PDR for access network traffic to create a full PDR.

Embodiment 14

A method for User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, the method comprising:
  receiving (912) from a Session Management Function, SMF, a first session setup request;
  receiving (924) from a N3IWF a second session setup request;
  wherein at least one of the first session setup request and the second session setup request comprises a first preliminary Packet Detection Rule, PDR, and wherein the N3IWF-UP generates a second preliminary PDR; and
  correlating a the first and second preliminary PDR to create a full PDR.

Embodiment 15

A method for User Plane Separation, UPS, and User Plane Local Offloading, UPL, for Fifth Generation, 5G, non-Third Generation Partnership Project, 3GPP, access and implemented in a Session Management Function, SMF, the method comprising:
  sending (1000) to a user plane node a per Quality of Service, QoS, Flow preliminary Packet Detection Rule, PDR, for core network traffic; and
  sending (1002) to a N3IWF a QoS Flow-PDR binding and a QoS profile.

Embodiment 16

A method for User Plane Separation, UPS, and User Plane Local Offloading, UPL, for Fifth Generation, 5G, non-Third Generation Partnership Project, 3GPP, access and implemented in a Non-3GPP Interworking Function entity, N3IWF, the method comprising:
  receiving (1002) from a Session Management Function, SMF, a Quality of Service, QoS, Flow-Packet Detection Rule, PDR, binding and a QoS profile;
  generating a per QoS Flow preliminary PDR for access network traffic; and
  sending (1004) to a user plane node the per QoS Flow preliminary PDR for access network traffic.

Embodiment 17

A method for User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, the method comprising:
  receiving (1000) from a Session Management Function, SMF, a per Quality of Service, QoS, Flow preliminary Packet Detection Rule, PDR, for core network traffic;

receiving (1004) from a N3IWF a per QoS Flow preliminary PDR for access network traffic; and correlating the per QoS Flow preliminary PDR for core network traffic with the per QoS Flow preliminary PDR for access network traffic to generate a full PDR.

Embodiment 18

A method for User Plane Separation, UPS, and User Plane Local Offloading, UPL, for Fifth Generation, 5G, non-Third Generation Partnership Project, 3GPP, access and implemented in a Session Management Function, SMF, the method comprising:

sending (1100) to a Non-3GPP Interworking Function, N3IWF, with User Plane Function, UPF, capability a per Quality of Service, QoS, Flow preliminary Packet Detection Rule, PDR, for core network traffic; and sending (1102) to the N3IWF with UPF capability a QoS Flow-PDR binding and a QoS profile.

Embodiment 19

A method for User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, with User Plane Function, UPF, capability, the method comprising:

receiving (1100) from a Session Management Function, SMF, a per Quality of Service, QoS, Flow preliminary Packet Detection Rule, PDR, for core network traffic;

receiving (1102) from the SMF a QoS Flow-PDR binding and a QoS profile;

generating (1104) a per QoS Flow preliminary PDR for access network traffic; and correlating (1106) the per QoS Flow preliminary PDR for core network traffic with the per QoS Flow preliminary PDR for access network traffic to generate a full PDR.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 4G | Fourth Generation |
| 5G | Fifth Generation |
| AGF | Access Gateway Function |
| AKA | Authentication and Key Agreement |
| AMF | Access and Mobility Management Function |
| AN | Access Network |
| AP | (WLAN) Access Point |
| APN | Access Point Name |
| AS | Access Stratum |
| ASIC | Application Specific Integrated Circuit |
| BBF | Broadband Forum |
| BP | Branching Point |
| BSC | Base Station Controller |
| BTS | Base Transceiver Station |
| CD | Compact Disk |
| CL | Classifier |
| COTS | Commercial Off-the-Shelf |
| CP | Control Plane |
| CPE | Customer Premises Equipment |
| CPU | Central Processing Unit |
| CS-VLAN | Customer/Service Virtual Local Area Network |
| CUPS | Control Plane and User Plane Separation |
| CVID | Customer VLAN Identifier |
| C-VLAN | Customer Virtual Local Area Network |
| D2D | Device-to-Device |
| DAS | Distributed Antenna System |
| DHCP | Dynamic Host Configuration Protocol |
| DL | Downlink |
| DN | Data Network |
| DSP | Digital Signal Processor |
| DVD | Digital Video Disk |
| EAP | Extensible Authentication Protocol |
| EMSK | Extended Master Session Key |
| eNB | Enhanced or Evolved Node B |
| EPC | Evolved Packet Core |
| ePDG | evolved Packet Data Gateway |
| E-SMLC | Evolved Serving Mobile Location Center |
| ESP | Encapsulating Security Payload |
| FAR | Forwarding Action Rule |
| FMC | Fixed and Mobile Convergence |
| FPGA | Field Programmable Gate Array |
| GHz | Gigahertz |
| gNB | New Radio Base Station |
| GPRS | General Packet Radio Service |
| GSM | Global System for Mobile Communications |
| GTP | General Packet Radio Service Tunneling Protocol |
| IETF | Internet Engineering Task Force |
| IKE | Internet Key Exchange protocol |
| IKEv2 | Internet Key Exchange protocol, Version 2 |
| IoT | Internet of Things |
| IP | Internet Protocol |
| IPSec, IPSEC | IP Security |
| LAI | Location Area Identity |
| LBO | Local breakout |
| LEE | Laptop Embedded Equipment |
| LME | Laptop Mounted Equipment |
| LTE | Long Term Evolution |
| M2M | Machine-to-Machine |
| MAC | Media Access Control |
| MANO | Management and Orchestration |
| MCE | Multi-Cell/Multicast Coordination Entity |
| MDT | Minimization of Drive Tests |
| MEC | Mobile Edge Computing or Multi-access Edge Computing |
| MIMO | Multiple Input Multiple Output |
| MME | Mobility Management Entity |
| MOBIKE | IKEv2 Mobility and Multihoming Protocol |
| MSC | Mobile Switching Center |
| MSK | Master Session Key |
| MSR | Multi-Standard Radio |
| MTC | Machine Type Communication |
| N3IWF | Non-3GPP Interworking Function |
| N3IWF-CP | N3IWF Control Plane |
| N3IWF-UP | N3IWF User Plane |
| NAS | Non-Access Stratum |
| NB-IoT | Narrowband Internet of Things |
| NEF | Network Exposure Function |
| NFV | Network Function Virtualization |
| NIC | Network Interface Controller |
| NR | New Radio |
| O&M | Operation and Maintenance |
| ONE UP | One single UP node with N3IWF-UP function and UPF combined |
| OSS | Operations Support System |
| OTT | Over-the-Top |
| PCF | Policy Control Function |
| PDA | Personal Digital Assistant |
| PDG | Packet Data Gateway |
| PDI | Packet Detection Information |
| PDN | Packet Data Network |
| PDR | Packet Detection Rule |
| PDU | Protocol Data Unit |
| P-GW, PGW | Packet Data Network Gateway |
| PGW-C | Packet Data Network Gateway Control Plane |
| PGW-U | Packet Data Network Gateway User Plane |
| PSK | Pre-shared Key |
| QFI | Quality of Service Flow Identity |
| QoS Flow | defined in 5G, the QoS Flow is the finest granularity of QoS differentiation in the PDU Session |
| RAI | Routing Area Identity |
| RAM | Random Access Memory |
| RAN | Radio Access Network |
| RAT | Radio Access Technology |
| RF | Radio Frequency |

| | |
|---|---|
| RNC | Radio Network Controller |
| ROM | Read Only Memory |
| RRH | Remote Radio Head |
| RRU | Remote Radio Unit |
| SA | Security Association |
| SCEF | Service Capability Exposure Function |
| SDN | Software Defined Network/Networking |
| SEID | Session Identifier |
| S-GW, SGW | Serving Gateway |
| SGW-C | Serving Gateway Control Plane |
| SGW-U | Serving Gateway User Plane |
| SLA | Service Level Agreement |
| SM | Session Management |
| SMF | Session Management Function |
| SOC | System on a Chip |
| SON | Self-Organizing Network |
| SPD | Security Policy Database |
| SPI | Security Parameter Index |
| SVID | Server VLAN Identifier |
| S-VLAN | Service Virtual Local Area Network |
| TDF | Traffic Detection Function |
| TDF-C | Traffic Detection Function Control Plane |
| TDF-U | Traffic Detection Function User Plane |
| TEID | Tunnel Endpoint Identifier |
| TLS | Transport Layer Security Protocol |
| TWAG | Trusted WLAN Access Gateway |
| UDP | User Datagram Protocol |
| UE | User Equipment |
| UL | Uplink |
| UL CL | Uplink Classifier |
| UP | User Plane |
| UPF | User Plane Function |
| UPL | User Plane Local Offloading |
| UPS | User Plane Separation (from Control Plane) |
| USB | Universal Serial Bus |
| V2I | Vehicle-to-Infrastructure |
| V2V | Vehicle-to-Vehicle |
| V2X | Vehicle-to-Everything |
| VLAN | Virtual Local Area Network |
| VMM | Virtual Machine Monitor |
| VNE | Virtual Network Element |
| VNF | Virtual Network Function |
| VoIP | Voice over Internet Protocol |
| VoWIFI | Voice over Wi-Fi, A.K.A Wi-Fi calling |
| WCDMA | Wideband Code Division Multiple Access |
| WiMax | Worldwide Interoperability for Microwave Access |
| WLAN | Wireless Local Area Networks, A.K.A Wi-Fi |
| WLCP | Wireless Local Area Network Control Protocol |
| WWC | Wireless and Wireline Convergence |

Those skilled in the art will recognize improvements and modifications to the embodiments of the present disclosure. All such improvements and modifications are considered within the scope of the concepts disclosed herein.

REFERENCES

[1] 3GPP TS 23.501vf00: 5G System Architecture accesses
[2] 3GPP TS 23.502vf00: 5G System Procedures
[3] 3GPP TS23.214vf10: Architecture of Control Plane and User Plane Separation (CUPS)
[4] 3GPP TS29.244vf00: CUPS interface
[5] 3GPP TR23.716: Wireless and Wireline Convergence for 5G system architecture
[6] RFC 7296: Internet Key Exchange (IKEv2) Protocol
[7] RFC 5685: IKE redirection
[8] RFC 7791: IKE clone
[9] RFC 4555: IKEv2 Mobility and Multihoming Protocol (MOBIKE)
[10 IETF: IKEv2 Multihoming support: draft-suresh-ip-secme-ikev2-] multihoming-support-02
[11 IETF: Software-Defined Networking (SDN)-based IPsec Flow] Protection: draft-abad-sdnrg-sdn-ipsec-flow-protection-01
[12 RFC 5246: The Transport Layer Security (TLS) Protocol Version 1.2]
[13 RFC 5448: EAP-AKA': Improved Extensible Authentication Protocol] Method for 3rd Generation Authentication and Key Agreement
[14 IETF RFC 7426 Software-Defined Networking (SDN): Layers and] Architecture Terminology
[15 ONF: Software Defined and Virtualized Wireless Access,] community.comsoc.org/groups/rg-software-defined-and-virtualized-wireless-access
[16 BBF 5G FMC introduction BBF SD-407 5G Fixed Mobile Convergence] Study
[17 MEC introduction in ETSI:] www.etsi.org/images/files/technologies/MEC_Introduction_slides_SDN_World-_Congress_15-10-14.pdt www.etsi.org/images/files/ETSITechnologyLeaflets/MultiAccessEdgeComputing.pdf
[18 3GPP TS23.402: Architecture for non-3GPP access]

What is claimed is:

1. A method in a User Equipment, UE, of supporting User Plane Separation, UPS, and User Plane Local Offloading, UPL, in Fifth Generation, 5G, system, the method comprising:
   establishing an Internet Key Exchange, IKE, Security Association, SA, with a Non-Third Generation partnership Project, Non-3GPP, Interworking Function entity, N3IWF;
   negotiating with the N3IWF support of UPS;
   establishing a signaling Internet Protocol Security Association, IPSEC SA, with the N3IWF for registration and Non Access Stratum, NAS, signaling;
   receiving from the N3IWF a request to create an Internet Key Exchange, IKE, SA clone to be associated with an identified N3IWF-User Plane entity, N3IWF-UP;
   cloning the IKE SA;
   receiving a request to relocate the cloned IKE SA to the identified N3IWF-UP; and
   relocating the cloned IKE SA to the identified N3IWF-UP.

2. The method of claim 1, wherein relocating the cloned IKE SA to the identified N3IWF-UP is part of the request to create the IKE SA clone that is to be associated with the identified N3IWF-UP.

3. The method of claim 1, further comprising:
   receiving, from the N3IWF-UP, a request to create at least one data IPSEC SA for a channel between the UE and the N3IWF-UP; and
   creating at least one data IPSEC SA for the channel.

4. A method of supporting User Plane Separation, UPS, and User Plane Local Offloading, UPL, for Fifth Generation, 5G, non-Third Generation Partnership Project, 3GPP, access and implemented in a Non-3GPP Interworking Function entity, N3IWF, User Plane, N3IWF-UP, the method comprising:
   receiving, from a N3IWF, a session setup request, the request comprising a cloned Internet Key Exchange, IKE, Security Association, SA, associated with a UE;
   instructing the UE associated with the cloned IKE SA to relocate the IKE SA between the N3IWF-UP and the UE;
   creating a new Internet Protocol Security, IPSEC, SA between the UE and the N3IWF-UP for at least one bearer;
   sending to the N3IWF, a setup session response; and
   establishing a Protocol Data Unit, PDU, session with a Session Management Function, SMF.

5. A method of supporting User Plane Separation, UPS, and User Plane Local Offloading, UPL, for Fifth Generation, 5G, non-Third Generation Partnership Project, 3GPP, access and implemented in a User Equipment, UE, the method comprising:

establishing an Internet Key Exchange, IKE, Security Association, SA, with a Non-3GPP Interworking Function entity, N3IWF;

negotiating with the N3IWF support of UPS;

establishing a signaling Internet Protocol Security, IPSEC, SA with the N3IWF for registration and transport of Non Access Stratum, NAS, signaling; and receiving a request to set up an endpoint-separated data IPSEC SA between the UE and a target N3IWF-UP for the user plane.

6. The method of claim 5 wherein receiving the request to set up an endpoint-separated data IPSEC SA between the UE and the target N3IWF-UP for the user plane comprises:

receiving a request to create an IKE SA clone that is associated with the target N3IWF-UP and using the cloned IKE SA to set up the data IPSEC SA between the UE and the target N3IWF-UP; or receiving a request to set up the data IPSEC SA between the UE and the target N3IWF-UP via the existing IKE SA clone.

7. A method of supporting User Plane Separation, UPS, and User Plane Local Offloading, UPL, for Fifth Generation, 5G, non-Third Generation Partnership Project, 3GPP, access and implemented in a Non-3GPP Interworking Function, N3IWF, User Plane, UP, entity, N3IWF-UP, the method comprising:

receiving from a N3IWF a session setup request, the request comprising at least one of an Internet Protocol Security, IPSEC, Security Association, SA, a key, or a Security Parameter Index, SPI, associated with a User Equipment, UE; and sending to the N3IWF a session setup response.

\* \* \* \* \*